US008669670B2

(12) United States Patent  
Donnelly et al.

(10) Patent No.: US 8,669,670 B2  
(45) Date of Patent: Mar. 11, 2014

(54) GAS TURBINE ENGINE CONFIGURATIONS

(75) Inventors: Frank Wegner Donnelly, North Vancouver (CA); David William Dewis, North Hampton, NH (US)

(73) Assignee: ICR Turbine Engine Corporation, Hampton, NH (US)

( * ) Notice: Subject to any disclaimer, the term of this patent is extended or adjusted under 35 U.S.C. 154(b) by 302 days.

(21) Appl. No.: 13/226,156

(22) Filed: Sep. 6, 2011

(65) Prior Publication Data

US 2012/0175886 A1  Jul. 12, 2012

Related U.S. Application Data

(60) Provisional application No. 61/380,018, filed on Sep. 3, 2010, provisional application No. 61/406,818, filed on Oct. 26, 2010.

(51) Int. Cl.  
*F01D 15/10* (2006.01)

(52) U.S. Cl.  
USPC ................ 290/52; 290/1 A; 60/39.15; 60/772

(58) Field of Classification Search  
None  
See application file for complete search history.

(56) References Cited

U.S. PATENT DOCUMENTS

| | | | |
|---|---|---|---|
| 2,463,964 | A | 3/1949 | Graf |
| 2,543,677 | A | 2/1951 | Traupel |
| 2,696,711 | A | 12/1954 | Marchant et al. |
| 2,711,071 | A | 6/1955 | Frankel |
| 3,032,987 | A | 5/1962 | Taylor |
| 3,091,933 | A | 6/1963 | Wagner et al. |
| 3,166,902 | A | 1/1965 | Maljanian et al. |
| 3,209,536 | A | 10/1965 | Howes et al. |
| 3,518,472 | A | 6/1970 | O'Callaghan |
| 3,639,076 | A | 2/1972 | Rowen |
| 3,646,753 | A | 3/1972 | Stearns et al. |
| 3,660,977 | A | 5/1972 | Reynolds |
| 3,706,203 | A | 12/1972 | Goldberg et al. |
| 3,729,928 | A | 5/1973 | Rowen |
| 3,748,491 | A | 7/1973 | Barrigher et al. |

(Continued)

FOREIGN PATENT DOCUMENTS

| | | |
|---|---|---|
| AT | 311027 | 12/2005 |
| AU | 582981 | 4/1989 |

(Continued)

OTHER PUBLICATIONS

U.S. Appl. No. 13/039,088, filed Mar. 2, 2011, Donnelly.

(Continued)

*Primary Examiner* — Michael Zarroli  
(74) *Attorney, Agent, or Firm* — Sheridan Ross P.C.

(57) ABSTRACT

A system of dense packaging of turbomachinery in a gas turbine engine by means of close-coupling of components and by the ability to rotate various engine components with respect to other engine components is disclosed. In addition, spool shaft rotational direction may be reversed to suit the application. In multiple engine configurations, the same ability to close-couple and rotate components and to reverse shaft rotational direction in order to rearrange the engine geometry package is used for packaging two or more gas turbine engines to achieve high power density. Dense-packing is possible because of a number of features of the basic engine. These features include: the use of compact centrifugal compressors and radial turbine assemblies; the close coupling of turbomachinery for a dense packaging; the ability to rotate certain key components so as to facilitate ducting and preferred placement of other components; the ability to control spool shaft rotational direction; and operation at high overall pressure ratios.

34 Claims, 24 Drawing Sheets

(56) References Cited

U.S. PATENT DOCUMENTS

| | | |
|---|---|---|
| 3,764,814 A | 10/1973 | Griffith |
| 3,766,732 A | 10/1973 | Woodcock |
| 3,817,343 A | 6/1974 | Albrecht |
| 3,848,636 A | 11/1974 | McCombs |
| 3,888,337 A | 6/1975 | Worthen et al. |
| 3,893,293 A | 7/1975 | Moore |
| 3,937,588 A | 2/1976 | Kisslan |
| 3,939,653 A | 2/1976 | Schirmer |
| 3,945,199 A | 3/1976 | Bradley et al. |
| 3,953,967 A | 5/1976 | Smith |
| 3,964,253 A | 6/1976 | Paduch et al. |
| 3,977,183 A | 8/1976 | Stearns |
| 3,986,364 A | 10/1976 | Cronin et al. |
| 3,986,575 A | 10/1976 | Eggmann |
| 3,999,373 A | 12/1976 | Bell et al. |
| 3,999,375 A | 12/1976 | Smith et al. |
| 4,002,058 A | 1/1977 | Wolfinger |
| 4,005,946 A | 2/1977 | Brown et al. |
| 4,027,472 A | 6/1977 | Stearns |
| 4,027,473 A | 6/1977 | Baker |
| 4,056,019 A | 11/1977 | Ahlen |
| 4,059,770 A | 11/1977 | Mackay |
| 4,082,115 A | 4/1978 | Gibb et al. |
| 4,122,668 A | 10/1978 | Chou et al. |
| 4,242,042 A | 12/1980 | Schwarz |
| 4,242,871 A | 1/1981 | Breton |
| 4,248,040 A | 2/1981 | Kast |
| 4,270,357 A | 6/1981 | Rossi et al. |
| 4,276,744 A | 7/1981 | Pisano |
| 4,277,938 A | 7/1981 | Belke et al. |
| 4,280,327 A | 7/1981 | Mackay |
| 4,282,948 A | 8/1981 | Jerome |
| 4,312,191 A | 1/1982 | Biagini |
| 4,336,856 A | 6/1982 | Gamell |
| 4,399,651 A | 8/1983 | Geary et al. |
| 4,411,595 A | 10/1983 | Pisano |
| 4,449,359 A | 5/1984 | Cole et al. |
| 4,467,607 A | 8/1984 | Rydquist et al. |
| 4,470,261 A | 9/1984 | Kronogard et al. |
| 4,474,007 A | 10/1984 | Kronogard et al. |
| 4,492,874 A | 1/1985 | Near |
| 4,494,372 A | 1/1985 | Cronin |
| 4,499,756 A | 2/1985 | Medeiros et al. |
| 4,509,333 A | 4/1985 | Nussdorfer et al. |
| 4,754,607 A | 7/1988 | Mackay |
| 4,783,957 A | 11/1988 | Harris |
| 4,815,278 A | 3/1989 | White |
| 4,819,436 A | 4/1989 | Ahner et al. |
| 4,858,428 A | 8/1989 | Paul |
| 4,864,811 A | 9/1989 | Pfefferle |
| 5,010,729 A | 4/1991 | Adamson et al. |
| 5,036,267 A | 7/1991 | Markunas et al. |
| 5,069,032 A | 12/1991 | White |
| 5,081,832 A | 1/1992 | Mowill |
| 5,083,039 A | 1/1992 | Richardson et al. |
| 5,090,193 A | 2/1992 | Schwarz et al. |
| 5,097,658 A | 3/1992 | Klaass et al. |
| 5,113,669 A | 5/1992 | Coffinberry |
| 5,129,222 A | 7/1992 | Lampe et al. |
| 5,144,299 A | 9/1992 | Smith |
| 5,214,910 A | 6/1993 | Adair |
| 5,231,822 A | 8/1993 | Shekleton |
| 5,253,470 A | 10/1993 | Newton |
| 5,276,353 A | 1/1994 | Kobayashi et al. |
| 5,301,500 A | 4/1994 | Hines |
| 5,329,757 A | 7/1994 | Faulkner et al. |
| 5,333,989 A | 8/1994 | Missana et al. |
| 5,343,692 A | 9/1994 | Thomson et al. |
| 5,349,814 A | 9/1994 | Ciokajlo et al. |
| 5,427,455 A | 6/1995 | Bosley |
| 5,448,889 A | 9/1995 | Bronicki |
| 5,450,724 A | 9/1995 | Kesseli et al. |
| 5,488,823 A | 2/1996 | Faulkner et al. |
| 5,497,615 A | 3/1996 | Noe et al. |
| 5,529,398 A | 6/1996 | Bosley |
| 5,549,174 A | 8/1996 | Reis |
| 5,555,719 A | 9/1996 | Rowen et al. |
| 5,564,270 A | 10/1996 | Kesseli et al. |
| 5,586,429 A | 12/1996 | Kesseli et al. |
| 5,609,655 A | 3/1997 | Kesseli et al. |
| 5,610,962 A | 3/1997 | Solorzano et al. |
| 5,685,156 A | 11/1997 | Willis et al. |
| 5,697,848 A | 12/1997 | Bosley |
| 5,722,259 A | 3/1998 | Sorensen et al. |
| 5,742,515 A | 4/1998 | Runkle et al. |
| 5,752,380 A | 5/1998 | Bosley et al. |
| 5,784,268 A | 7/1998 | Steffek et al. |
| 5,791,868 A | 8/1998 | Bosley et al. |
| 5,819,524 A | 10/1998 | Bosley et al. |
| 5,820,074 A | 10/1998 | Trommer et al. |
| 5,827,040 A | 10/1998 | Bosley et al. |
| 5,850,732 A | 12/1998 | Willis et al. |
| 5,850,733 A | 12/1998 | Bosley et al. |
| 5,873,235 A | 2/1999 | Bosley et al. |
| 5,894,720 A | 4/1999 | Willis et al. |
| 5,899,673 A | 5/1999 | Bosley et al. |
| 5,903,116 A | 5/1999 | Geis et al. |
| 5,915,841 A | 6/1999 | Weissert |
| 5,918,985 A | 7/1999 | Bosley |
| 5,928,301 A | 7/1999 | Soga et al. |
| 5,929,538 A | 7/1999 | O'Sullivan et al. |
| 5,954,174 A | 9/1999 | Costin |
| 5,964,663 A | 10/1999 | Stewart et al. |
| 5,966,926 A | 10/1999 | Shekleton et al. |
| 5,983,992 A | 11/1999 | Child et al. |
| 5,992,139 A | 11/1999 | Kesseli |
| 6,002,603 A | 12/1999 | Carver |
| 6,011,377 A | 1/2000 | Heglund et al. |
| 6,016,658 A | 1/2000 | Willis et al. |
| 6,020,713 A | 2/2000 | Geis et al. |
| 6,023,135 A | 2/2000 | Gilbreth et al. |
| 6,031,294 A | 2/2000 | Geis et al. |
| 6,037,687 A | 3/2000 | Stewart et al. |
| 6,049,195 A | 4/2000 | Geis et al. |
| 6,062,016 A | 5/2000 | Edelman |
| 6,065,281 A | 5/2000 | Shekleton et al. |
| 6,070,404 A | 6/2000 | Bosley et al. |
| 6,082,112 A | 7/2000 | Shekleton |
| 6,085,524 A | 7/2000 | Persson |
| 6,093,975 A | 7/2000 | Peticolas |
| 6,094,799 A | 8/2000 | Stewart et al. |
| 6,107,693 A | 8/2000 | Mongia et al. |
| 6,138,781 A | 10/2000 | Hakala |
| D433,997 S | 11/2000 | Laituri et al. |
| 6,141,953 A | 11/2000 | Mongia et al. |
| 6,155,076 A | 12/2000 | Cullen et al. |
| 6,155,780 A | 12/2000 | Rouse |
| 6,158,892 A | 12/2000 | Stewart et al. |
| 6,169,334 B1 | 1/2001 | Edelman |
| 6,170,251 B1 | 1/2001 | Skowronski et al. |
| 6,178,751 B1 | 1/2001 | Shekleton et al. |
| 6,190,048 B1 | 2/2001 | Weissert |
| 6,192,668 B1 | 2/2001 | Mackay |
| 6,194,794 B1 | 2/2001 | Lampe et al. |
| 6,205,765 B1 | 3/2001 | Iasillo et al. |
| 6,205,768 B1 | 3/2001 | Dibble et al. |
| 6,213,234 B1 | 4/2001 | Rosen et al. |
| 6,239,520 B1 | 5/2001 | Stahl et al. |
| 6,265,786 B1 | 7/2001 | Bosley et al. |
| 6,274,945 B1 | 8/2001 | Gilbreth et al. |
| 6,281,596 B1 | 8/2001 | Gilbreth et al. |
| 6,281,601 B1 | 8/2001 | Edelman et al. |
| 6,305,079 B1 | 10/2001 | Child et al. |
| 6,314,717 B1 | 11/2001 | Teets et al. |
| 6,316,841 B1 | 11/2001 | Weber |
| 6,324,828 B1 | 12/2001 | Willis et al. |
| 6,324,846 B1 | 12/2001 | Clarke |
| 6,325,142 B1 | 12/2001 | Bosley et al. |
| 6,349,787 B1 | 2/2002 | Dakhil |
| 6,355,987 B1 | 3/2002 | Bixel |
| 6,361,271 B1 | 3/2002 | Bosley |
| 6,381,944 B2 | 5/2002 | Mackay |
| 6,405,522 B1 | 6/2002 | Pont et al. |
| 6,410,992 B1 | 6/2002 | Wall et al. |

(56) References Cited

U.S. PATENT DOCUMENTS

| | | |
|---|---|---|
| 6,425,732 B1 | 7/2002 | Rouse et al. |
| 6,437,468 B2 | 8/2002 | Stahl et al. |
| 6,438,936 B1 | 8/2002 | Ryan |
| 6,438,937 B1 | 8/2002 | Pont et al. |
| 6,453,658 B1 | 9/2002 | Willis et al. |
| 6,468,051 B2 | 10/2002 | Lampe et al. |
| 6,487,096 B1 | 11/2002 | Gilbreth et al. |
| 6,489,692 B1 | 12/2002 | Gilbreth et al. |
| 6,495,929 B2 | 12/2002 | Bosley et al. |
| 6,499,949 B2 | 12/2002 | Schafrik et al. |
| 6,522,030 B1 | 2/2003 | Wall et al. |
| 6,526,757 B2 | 3/2003 | MacKay |
| 6,539,720 B2 | 4/2003 | Rouse et al. |
| 6,543,232 B1 | 4/2003 | Anderson et al. |
| 6,552,440 B2 | 4/2003 | Gilbreth et al. |
| 6,574,950 B2 | 6/2003 | Nash |
| 6,598,400 B2 | 7/2003 | Nash et al. |
| 6,601,392 B2 | 8/2003 | Child |
| 6,605,928 B2 | 8/2003 | Gupta et al. |
| 6,606,864 B2 | 8/2003 | MacKay |
| 6,612,112 B2 | 9/2003 | Gilbreth et al. |
| 6,629,064 B1 | 9/2003 | Wall |
| 6,634,176 B2 | 10/2003 | Rouse et al. |
| 6,639,328 B2 | 10/2003 | Wacknov |
| 6,644,916 B1 | 11/2003 | Beacom |
| RE38,373 E | 12/2003 | Bosley |
| 6,657,332 B2 | 12/2003 | Balas |
| 6,657,348 B2 | 12/2003 | Qin et al. |
| 6,663,044 B1 | 12/2003 | Munoz et al. |
| 6,664,653 B1 | 12/2003 | Edelman |
| 6,664,654 B2 | 12/2003 | Wall et al. |
| 6,675,583 B2 | 1/2004 | Willis et al. |
| 6,683,389 B2 | 1/2004 | Geis |
| 6,684,642 B2 | 2/2004 | Willis et al. |
| 6,698,208 B2 | 3/2004 | Teets |
| 6,698,554 B2 | 3/2004 | Desta et al. |
| 6,702,463 B1 | 3/2004 | Brockett et al. |
| 6,709,243 B1 | 3/2004 | Tan et al. |
| 6,713,892 B2 | 3/2004 | Gilbreth et al. |
| 6,720,685 B2 | 4/2004 | Balas |
| 6,729,141 B2 | 5/2004 | Ingram |
| 6,732,531 B2 | 5/2004 | Dickey |
| 6,735,951 B2 | 5/2004 | Thompson |
| 6,745,574 B1 | 6/2004 | Dettmer |
| 6,747,372 B2 | 6/2004 | Gilbreth et al. |
| 6,748,742 B2 | 6/2004 | Rouse et al. |
| 6,751,941 B2 | 6/2004 | Edelman et al. |
| 6,766,647 B2 | 7/2004 | Hartzheim |
| 6,784,565 B2 | 8/2004 | Wall et al. |
| 6,787,933 B2 | 9/2004 | Claude et al. |
| 6,794,766 B2 | 9/2004 | Wickert et al. |
| 6,796,527 B1 | 9/2004 | Munoz et al. |
| 6,804,946 B2 | 10/2004 | Willis et al. |
| 6,810,677 B2 | 11/2004 | Dewis |
| 6,812,586 B2 | 11/2004 | Wacknov et al. |
| 6,812,587 B2 | 11/2004 | Gilbreth et al. |
| 6,815,932 B2 | 11/2004 | Wall |
| 6,817,575 B1 | 11/2004 | Munoz et al. |
| 6,819,999 B2 | 11/2004 | Hartzheim |
| 6,823,675 B2 | 11/2004 | Brunell et al. |
| 6,829,899 B2 | 12/2004 | Benham, Jr. et al. |
| 6,832,470 B2 | 12/2004 | Dewis |
| 6,834,226 B2 | 12/2004 | Hartzheim |
| 6,836,720 B2 | 12/2004 | Hartzheim |
| 6,837,419 B2 | 1/2005 | Ryan |
| 6,845,558 B2 | 1/2005 | Beacom |
| 6,845,621 B2 | 1/2005 | Teets |
| 6,847,129 B2 | 1/2005 | McKelvey et al. |
| 6,847,194 B2 | 1/2005 | Sarlioglu et al. |
| 6,848,249 B2 | 2/2005 | Coleman et al. |
| 6,863,509 B2 | 3/2005 | Dewis |
| 6,864,595 B2 | 3/2005 | Wall |
| 6,870,279 B2 | 3/2005 | Gilbreth et al. |
| 6,877,323 B2 | 4/2005 | Dewis |
| 6,883,331 B2 | 4/2005 | Jonsson et al. |
| 6,888,263 B2 | 5/2005 | Satoh et al. |
| 6,891,282 B2 | 5/2005 | Gupta et al. |
| 6,895,760 B2 | 5/2005 | Kesseli |
| 6,897,578 B1 | 5/2005 | Olsen et al. |
| 6,909,199 B2 | 6/2005 | Gupta et al. |
| 6,911,742 B2 | 6/2005 | Gupta et al. |
| 6,931,856 B2 | 8/2005 | Belokon et al. |
| 6,951,110 B2 | 10/2005 | Kang |
| 6,956,301 B2 | 10/2005 | Gupta et al. |
| 6,958,550 B2 | 10/2005 | Gilbreth et al. |
| 6,960,840 B2 | 11/2005 | Willis et al. |
| 6,964,168 B1 | 11/2005 | Pierson et al. |
| 6,966,173 B2 | 11/2005 | Dewis |
| 6,968,702 B2 | 11/2005 | Child et al. |
| 6,973,880 B2 | 12/2005 | Kumar |
| 6,977,446 B2 | 12/2005 | Mackay |
| 6,979,914 B2 | 12/2005 | McKelvey et al. |
| 6,989,610 B2 | 1/2006 | Gupta et al. |
| 6,998,728 B2 | 2/2006 | Gupta et al. |
| 7,053,590 B2 | 5/2006 | Wang |
| 7,065,873 B2 | 6/2006 | Kang et al. |
| RE39,190 E | 7/2006 | Weissert |
| 7,092,262 B2 | 8/2006 | Ryan et al. |
| 7,093,443 B2 | 8/2006 | McKelvey et al. |
| 7,112,036 B2 | 9/2006 | Lubell et al. |
| 7,117,683 B2 | 10/2006 | Thompson |
| 7,147,050 B2 | 12/2006 | Kang et al. |
| 7,166,928 B2 | 1/2007 | Larsen |
| 7,181,337 B2 | 2/2007 | Kosaka |
| 7,185,496 B2 | 3/2007 | Herlihy |
| 7,186,200 B1 | 3/2007 | Hauser |
| 7,211,906 B2 | 5/2007 | Teets et al. |
| 7,224,081 B2 | 5/2007 | Larsen |
| 7,244,524 B2 | 7/2007 | McCluskey et al. |
| 7,266,429 B2 | 9/2007 | Travaly et al. |
| 7,285,871 B2 | 10/2007 | Derouineau |
| 7,299,638 B2 | 11/2007 | Mackay |
| 7,318,154 B2 | 1/2008 | Tehee |
| 7,325,401 B1 | 2/2008 | Kesseli et al. |
| 7,343,744 B2 | 3/2008 | Abelson et al. |
| 7,393,179 B1 | 7/2008 | Kesseli et al. |
| 7,398,642 B2 | 7/2008 | McQuiggan |
| 7,404,294 B2 | 7/2008 | Sundin |
| 7,415,764 B2 | 8/2008 | Kang et al. |
| 7,423,412 B2 | 9/2008 | Weng et al. |
| 7,464,533 B2 | 12/2008 | Wollenweber |
| 7,513,120 B2 | 4/2009 | Kupratis |
| RE40,713 E | 5/2009 | Geis et al. |
| 7,572,531 B2 | 8/2009 | Forte |
| 7,574,853 B2 | 8/2009 | Teets et al. |
| 7,574,867 B2 | 8/2009 | Teets et al. |
| 7,595,124 B2 | 9/2009 | Varatharajan et al. |
| 7,605,487 B2 | 10/2009 | Barton et al. |
| 7,605,498 B2 | 10/2009 | Ledenev et al. |
| 7,607,318 B2 | 10/2009 | Lui et al. |
| 7,608,937 B1 | 10/2009 | Altenschulte |
| 7,614,792 B2 | 11/2009 | Wade et al. |
| 7,615,881 B2 | 11/2009 | Halsey et al. |
| 7,617,687 B2 | 11/2009 | West et al. |
| 7,656,135 B2 | 2/2010 | Schram et al. |
| 7,671,481 B2 | 3/2010 | Miller et al. |
| 7,766,790 B2 | 8/2010 | Stevenson et al. |
| 7,770,376 B1 | 8/2010 | Brostmeyer |
| 7,777,358 B2 | 8/2010 | Halsey et al. |
| 7,804,184 B2 | 9/2010 | Yuan et al. |
| 7,841,185 B2 | 11/2010 | Richards et al. |
| 7,861,696 B2 | 1/2011 | Lund |
| 7,866,532 B1 | 1/2011 | Potter et al. |
| 7,921,944 B2 | 4/2011 | Russell et al. |
| 7,926,274 B2 | 4/2011 | Farkaly |
| 7,957,846 B2 | 6/2011 | Hakim et al. |
| 7,966,868 B2 | 6/2011 | Sonnichsen et al. |
| 8,015,812 B1 | 9/2011 | Kesseli et al. |
| 8,046,990 B2 | 11/2011 | Bollinger et al. |
| 8,188,693 B2 | 5/2012 | Wei et al. |
| 2001/0030425 A1 | 10/2001 | Gilbreth et al. |
| 2001/0052704 A1 | 12/2001 | Bosley et al. |
| 2002/0054718 A1 | 5/2002 | Weissert |
| 2002/0063479 A1 | 5/2002 | Mitchell et al. |

(56) References Cited

U.S. PATENT DOCUMENTS

| | | |
|---|---|---|
| 2002/0067872 A1 | 6/2002 | Weissert |
| 2002/0073688 A1 | 6/2002 | Bosley et al. |
| 2002/0073713 A1 | 6/2002 | Mackay |
| 2002/0079760 A1 | 6/2002 | Vessa |
| 2002/0083714 A1 | 7/2002 | Bakholdin |
| 2002/0096393 A1 | 7/2002 | Rouse |
| 2002/0096959 A1 | 7/2002 | Qin et al. |
| 2002/0097928 A1 | 7/2002 | Swinton et al. |
| 2002/0099476 A1 | 7/2002 | Hamrin et al. |
| 2002/0103745 A1 | 8/2002 | Lof et al. |
| 2002/0104316 A1 | 8/2002 | Dickey et al. |
| 2002/0110450 A1 | 8/2002 | Swinton |
| 2002/0119040 A1 | 8/2002 | Bosley |
| 2002/0120368 A1 | 8/2002 | Edelman et al. |
| 2002/0124569 A1 | 9/2002 | Treece et al. |
| 2002/0128076 A1 | 9/2002 | Lubell |
| 2002/0148229 A1 | 10/2002 | Pont et al. |
| 2002/0149205 A1 | 10/2002 | Gilbreth et al. |
| 2002/0149206 A1 | 10/2002 | Gilbreth et al. |
| 2002/0157881 A1 | 10/2002 | Bakholdin et al. |
| 2002/0158517 A1 | 10/2002 | Rouse et al. |
| 2002/0166324 A1 | 11/2002 | Willis et al. |
| 2003/0110773 A1 | 6/2003 | Rouse et al. |
| 2004/0008010 A1 | 1/2004 | Ebrahim et al. |
| 2004/0011038 A1 | 1/2004 | Stinger et al. |
| 2004/0035656 A1 | 2/2004 | Anwar et al. |
| 2004/0080165 A1 | 4/2004 | Geis et al. |
| 2004/0090204 A1 | 5/2004 | McGinley |
| 2004/0103669 A1 | 6/2004 | Willis et al. |
| 2004/0106486 A1 | 6/2004 | Jonsson |
| 2004/0119291 A1 | 6/2004 | Hamrin et al. |
| 2004/0148942 A1 | 8/2004 | Pont et al. |
| 2004/0160061 A1 | 8/2004 | Rouse et al. |
| 2005/0000224 A1 | 1/2005 | Jonsson |
| 2005/0103931 A1 | 5/2005 | Morris et al. |
| 2005/0206331 A1 | 9/2005 | Donnelly |
| 2005/0228553 A1 | 10/2005 | Tryon |
| 2006/0076171 A1 | 4/2006 | Donnelly et al. |
| 2006/0090109 A1 | 4/2006 | Bonnet |
| 2007/0012129 A1 | 1/2007 | Maty et al. |
| 2007/0068712 A1 | 3/2007 | Carnahan |
| 2007/0178340 A1 | 8/2007 | Eickhoff |
| 2007/0181294 A1 | 8/2007 | Soldner et al. |
| 2007/0239325 A1 | 10/2007 | Regunath |
| 2007/0290039 A1 | 12/2007 | Pfleging et al. |
| 2008/0080682 A1 | 4/2008 | Ogunwale et al. |
| 2008/0148708 A1 | 6/2008 | Chou et al. |
| 2008/0197705 A1 | 8/2008 | Dewis et al. |
| 2009/0045292 A1 | 2/2009 | Maddali et al. |
| 2009/0071478 A1 | 3/2009 | Kalfon |
| 2009/0090109 A1 | 4/2009 | Mills et al. |
| 2009/0106978 A1 | 4/2009 | Wollenweber |
| 2009/0109022 A1 | 4/2009 | Gangopadhyay et al. |
| 2009/0158739 A1 | 6/2009 | Messmer |
| 2009/0211260 A1 | 8/2009 | Kesseli et al. |
| 2009/0211739 A1 | 8/2009 | Nash et al. |
| 2009/0211740 A1 | 8/2009 | Kesseli et al. |
| 2009/0249786 A1 | 10/2009 | Garrett et al. |
| 2009/0271086 A1 | 10/2009 | Morris et al. |
| 2009/0292436 A1 | 11/2009 | D'Amato et al. |
| 2009/0313990 A1 | 12/2009 | Mustafa |
| 2010/0021284 A1 | 1/2010 | Watson et al. |
| 2010/0052425 A1 | 3/2010 | Moore et al. |
| 2010/0154380 A1 | 6/2010 | Tangirala et al. |
| 2010/0229525 A1 | 9/2010 | Mackay et al. |
| 2010/0288571 A1 | 11/2010 | Dewis et al. |
| 2010/0293946 A1 | 11/2010 | Vick |
| 2010/0319355 A1 | 12/2010 | Prabhu |
| 2011/0020108 A1 | 1/2011 | Axelsson et al. |
| 2011/0100777 A1 | 5/2011 | Wilton et al. |
| 2011/0215640 A1 | 9/2011 | Donnelly et al. |
| 2011/0288738 A1 | 11/2011 | Donnelly et al. |
| 2011/0295453 A1 | 12/2011 | Betz et al. |
| 2012/0000204 A1 | 1/2012 | Kesseli et al. |
| 2012/0017598 A1 | 1/2012 | Kesseli et al. |
| 2012/0042656 A1 | 2/2012 | Donnelly et al. |
| 2012/0096869 A1 | 4/2012 | Kesseli et al. |
| 2012/0102911 A1 | 5/2012 | Dewis et al. |
| 2012/0201657 A1 | 8/2012 | Donnelly et al. |
| 2012/0260662 A1 | 10/2012 | Nash et al. |
| 2012/0324903 A1 | 12/2012 | Dewis et al. |
| 2013/0111923 A1 | 5/2013 | Donnelly et al. |
| 2013/0133480 A1 | 5/2013 | Donnelly |
| 2013/0139519 A1 | 6/2013 | Kesseli et al. |

FOREIGN PATENT DOCUMENTS

| | | |
|---|---|---|
| AU | 587266 | 8/1989 |
| AU | 8517301 | 3/2002 |
| AU | 2025002 | 5/2002 |
| AU | 2589802 | 5/2002 |
| AU | 2004203836 | 3/2005 |
| AU | 2004208656 | 2/2009 |
| AU | 2004318142 | 6/2009 |
| CA | 1050637 | 3/1979 |
| CA | 1068492 | 12/1979 |
| CA | 1098997 | 4/1981 |
| CA | 1099373 | 4/1981 |
| CA | 1133263 | 10/1982 |
| CA | 1171671 | 7/1984 |
| CA | 1190050 | 7/1985 |
| CA | 1202099 | 3/1986 |
| CA | 1244661 | 11/1988 |
| CA | 1275719 | 10/1990 |
| CA | 2066258 | 3/1991 |
| CA | 1286882 | 7/1991 |
| CA | 2220172 | 5/1998 |
| CA | 2234318 | 10/1998 |
| CA | 2238356 | 3/1999 |
| CA | 2242947 | 3/1999 |
| CA | 2246769 | 3/1999 |
| CA | 2279320 | 4/2000 |
| CA | 2677758 | 4/2000 |
| CA | 2317855 | 5/2001 |
| CA | 2254034 | 6/2007 |
| CA | 2638648 | 2/2009 |
| CA | 2689188 | 7/2010 |
| CH | 595552 | 2/1978 |
| CH | 679235 | 1/1992 |
| CN | 1052170 | 6/1991 |
| CN | 1060270 | 4/1992 |
| CN | 1306603 | 8/2001 |
| CN | 1317634 | 10/2001 |
| CN | 1902389 | 1/2007 |
| CN | 101098079 | 1/2008 |
| CN | 100564811 | 12/2009 |
| CN | 101635449 | 1/2010 |
| CN | 101672252 | 3/2010 |
| CS | 9101996 | 1/1992 |
| CZ | 20014556 | 4/2003 |
| DE | 1272306 | 7/1968 |
| DE | 2753673 | 6/1978 |
| DE | 2853919 | 6/1979 |
| DE | 3140694 | 7/1982 |
| DE | 3736984 | 5/1988 |
| DE | 69519684 | 8/2001 |
| DE | 10305352 | 9/2004 |
| DE | 69828916 | 3/2006 |
| DE | 60125441 | 2/2007 |
| DE | 60125583 | 2/2007 |
| DK | 331889 | 7/1989 |
| EP | 0092551 | 11/1983 |
| EP | 0093118 | 11/1983 |
| EP | 0104921 | 4/1984 |
| EP | 0157794 | 10/1985 |
| EP | 0377292 | 7/1990 |
| EP | 0319246 | 10/1990 |
| EP | 0432753 | 6/1991 |
| EP | 0455640 | 11/1991 |
| EP | 0472294 | 2/1992 |
| EP | 0478713 | 4/1992 |
| EP | 0493481 | 7/1992 |
| EP | 0522832 | 1/1993 |
| EP | 0620906 | 10/1994 |

(56) References Cited

FOREIGN PATENT DOCUMENTS

| | | |
|---|---|---|
| EP | 0691511 | 1/1996 |
| EP | 0754142 | 1/1997 |
| EP | 0784156 | 12/1997 |
| EP | 0837224 | 4/1998 |
| EP | 0837231 | 4/1998 |
| EP | 0901218 | 3/1999 |
| EP | 0698178 | 6/1999 |
| EP | 0963035 | 12/1999 |
| EP | 1055809 | 11/2000 |
| EP | 1075724 | 2/2001 |
| EP | 1046786 | 1/2002 |
| EP | 1071185 | 1/2002 |
| EP | 1215393 | 6/2002 |
| EP | 0739087 | 8/2002 |
| EP | 1240713 | 9/2002 |
| EP | 1277267 | 1/2003 |
| EP | 1283166 | 2/2003 |
| EP | 1305210 | 5/2003 |
| EP | 1340301 | 9/2003 |
| EP | 1340304 | 9/2003 |
| EP | 1341990 | 9/2003 |
| EP | 1342044 | 9/2003 |
| EP | 1346139 | 9/2003 |
| EP | 1436504 | 7/2004 |
| EP | 1203866 | 8/2004 |
| EP | 0800616 | 12/2004 |
| EP | 1519011 | 3/2005 |
| EP | 1132614 | 1/2007 |
| EP | 1790568 | 5/2007 |
| EP | 1813807 | 8/2007 |
| EP | 1825115 | 8/2007 |
| EP | 1860750 | 11/2007 |
| EP | 1939396 | 7/2008 |
| EP | 2028104 | 2/2009 |
| EP | 1638184 | 3/2009 |
| EP | 1648096 | 7/2009 |
| EP | 2108828 | 10/2009 |
| EP | 1728990 | 11/2009 |
| EP | 2161444 | 3/2010 |
| EP | 2169800 | 3/2010 |
| EP | 1713141 | 5/2010 |
| EP | 1728304 | 6/2010 |
| EP | 1468180 | 7/2010 |
| FR | 2467286 | 11/1985 |
| FR | 2637942 | 4/1990 |
| FR | 2645908 | 10/1990 |
| FR | 2755319 | 4/1998 |
| FR | 2848647 | 6/2004 |
| GB | 612817 | 11/1948 |
| GB | 671379 | 5/1952 |
| GB | 673961 | 6/1952 |
| GB | 706743 | 4/1954 |
| GB | 731735 | 6/1955 |
| GB | 761955 | 11/1956 |
| GB | 768047 | 2/1957 |
| GB | 784119 | 10/1957 |
| GB | 786001 | 11/1957 |
| GB | 789589 | 1/1958 |
| GB | 807267 | 1/1959 |
| GB | 817507 | 7/1959 |
| GB | 834550 | 5/1960 |
| GB | 864712 | 4/1961 |
| GB | 874251 | 8/1961 |
| GB | 877838 | 9/1961 |
| GB | 878552 | 10/1961 |
| GB | 885184 | 12/1961 |
| GB | 917392 | 2/1963 |
| GB | 919540 | 2/1963 |
| GB | 920408 | 3/1963 |
| GB | 924078 | 4/1963 |
| GB | 931926 | 7/1963 |
| GB | 937278 | 9/1963 |
| GB | 937681 | 9/1963 |
| GB | 950015 | 2/1964 |
| GB | 950506 | 2/1964 |
| GB | 977402 | 12/1964 |
| GB | 993039 | 5/1965 |
| GB | 1004953 | 9/1965 |
| GB | 1008310 | 10/1965 |
| GB | 1009115 | 11/1965 |
| GB | 1012909 | 12/1965 |
| GB | 1043271 | 9/1966 |
| GB | 1083943 | 9/1967 |
| GB | 1097623 | 1/1968 |
| GB | 1103032 | 2/1968 |
| GB | 1127856 | 9/1968 |
| GB | 1137691 | 12/1968 |
| GB | 1138807 | 1/1969 |
| GB | 1141019 | 1/1969 |
| GB | 1148179 | 4/1969 |
| GB | 1158271 | 7/1969 |
| GB | 1172126 | 11/1969 |
| GB | 1174207 | 12/1969 |
| GB | 1211607 | 11/1970 |
| GB | 1270011 | 4/1972 |
| GB | 1275753 | 5/1972 |
| GB | 1275754 | 5/1972 |
| GB | 1275755 | 5/1972 |
| GB | 1301104 | 12/1972 |
| GB | 1348797 | 3/1974 |
| GB | 1392271 | 4/1975 |
| GB | 1454766 | 11/1976 |
| GB | 1460590 | 1/1977 |
| GB | 1516664 | 7/1978 |
| GB | 2019494 | 10/1979 |
| GB | 2074254 | 10/1981 |
| GB | 2089433 | 6/1982 |
| GB | 2123154 | 1/1984 |
| GB | 2174824 | 11/1986 |
| GB | 2184609 | 6/1987 |
| GB | 2199083 | 6/1988 |
| GB | 2211285 | 6/1989 |
| GB | 2218255 | 11/1989 |
| GB | 2232207 | 12/1990 |
| GB | 2341897 | 3/2000 |
| GB | 2355286 | 4/2001 |
| GB | 2420615 | 5/2006 |
| GB | 2426043 | 11/2006 |
| GB | 2435529 | 8/2007 |
| GB | 2436708 | 10/2007 |
| GB | 2441924 | 3/2008 |
| GB | 2442585 | 4/2008 |
| GB | 2456336 | 7/2009 |
| GB | 2456672 | 7/2009 |
| GB | 2447514 | 12/2009 |
| IN | 4946DELNP2006 | 8/2007 |
| IN | 4341DELNP2005 | 10/2007 |
| IN | 5879DELNP2008 | 9/2008 |
| IN | 2502DEL2005 | 10/2009 |
| IN | 1913DEL2009 | 6/2010 |
| IN | 55DEL2010 | 7/2010 |
| IN | 2013DEL2009 | 7/2010 |
| IT | 1173399 | 6/1987 |
| IT | 1194590 | 9/1988 |
| IT | MI311564 | 1/1992 |
| JP | 51-065252 | 6/1976 |
| JP | 56-088920 | 7/1981 |
| JP | 56-148624 | 11/1981 |
| JP | 56-148625 | 11/1981 |
| JP | 60-184973 | 9/1985 |
| JP | 61-182489 | 8/1986 |
| JP | 3182638 | 8/1991 |
| JP | 6201891 | 7/1994 |
| JP | 2519620 | 7/1996 |
| JP | 10-054561 | 2/1998 |
| JP | 10-061660 | 3/1998 |
| JP | 10-115229 | 5/1998 |
| JP | 10-122180 | 5/1998 |
| JP | 11-324727 | 11/1999 |
| JP | 2000-054855 | 2/2000 |
| JP | 2000-130319 | 5/2000 |
| JP | 2000-329096 | 11/2000 |
| JP | 2002-030942 | 1/2002 |
| JP | 2002-115565 | 4/2002 |

(56) References Cited

FOREIGN PATENT DOCUMENTS

| | | |
|---|---|---|
| JP | 2003-009593 | 1/2003 |
| JP | 2003-013744 | 1/2003 |
| JP | 2003-041906 | 2/2003 |
| JP | 2004-163087 | 6/2004 |
| JP | 2005-345095 | 12/2005 |
| JP | 2006-022811 | 1/2006 |
| JP | 2006-170208 | 6/2006 |
| JP | 2006-174694 | 6/2006 |
| JP | 2006-200438 | 8/2006 |
| JP | 2007-231949 | 9/2007 |
| JP | 2008-111438 | 5/2008 |
| JP | 2008-132973 | 6/2008 |
| JP | 2009-108756 | 5/2009 |
| JP | 2009-108860 | 5/2009 |
| JP | 2009-209931 | 9/2009 |
| JP | 2009-216085 | 9/2009 |
| JP | 2009-250040 | 10/2009 |
| JP | 2010-014114 | 1/2010 |
| JP | 2010-106835 | 5/2010 |
| KR | 19840002483 | 12/1984 |
| KR | 880002362 | 10/1988 |
| KR | 890001170 | 4/1989 |
| KR | 1020010007189 | 1/2001 |
| KR | 1020020024545 | 3/2002 |
| KR | 1020030032864 | 4/2003 |
| KR | 1020060096320 | 9/2006 |
| KR | 1020070078978 | 8/2007 |
| KR | 1020070113990 | 11/2007 |
| KR | 1020080033866 | 4/2008 |
| KR | 1020090121248 | 11/2009 |
| NL | 7903120 | 10/1979 |
| SE | 437543 | 3/1985 |
| SE | 9901718 | 5/1999 |
| SE | 0103180 | 3/2003 |
| WO | WO 8501326 | 3/1985 |
| WO | WO 9207221 | 4/1992 |
| WO | WO 9524072 | 9/1995 |
| WO | WO 9722176 | 6/1997 |
| WO | WO 9722789 | 6/1997 |
| WO | WO 9726491 | 7/1997 |
| WO | WO 9825014 | 6/1998 |
| WO | WO 9854448 | 12/1998 |
| WO | WO 9919161 | 4/1999 |
| WO | WO 0140644 | 6/2001 |
| WO | WO 0182448 | 11/2001 |
| WO | WO 0202920 | 1/2002 |
| WO | WO 0229225 | 4/2002 |
| WO | WO 0239045 | 5/2002 |
| WO | WO 0240844 | 5/2002 |
| WO | WO 0242611 | 5/2002 |
| WO | WO 0244574 | 6/2002 |
| WO | WO 0250618 | 6/2002 |
| WO | WO 02037638 | 9/2002 |
| WO | WO 03093652 | 6/2004 |
| WO | WO 2004077637 | 9/2004 |
| WO | WO 2005045345 | 5/2005 |
| WO | WO 2005099063 | 10/2005 |
| WO | WO 2008044972 | 4/2008 |
| WO | WO 2008044973 | 4/2008 |
| WO | WO 2008082334 | 7/2008 |
| WO | WO 2008082335 | 7/2008 |
| WO | WO 2008082336 | 7/2008 |
| WO | WO 2009067048 | 5/2009 |
| WO | WO 2010050856 | 5/2010 |
| WO | WO 2010082893 | 7/2010 |
| ZA | 8608745 | 7/1987 |

OTHER PUBLICATIONS

U.S. Appl. No. 13/090,104, filed Apr. 19, 2011, Donnelly et al.
U.S. Appl. No. 13/175,564, filed Jul. 1, 2011, Kesseli et al.
U.S. Appl. No. 13/180,275, filed Jul. 11, 2011, Kesseli et al.
U.S. Appl. No. 13/210,121, filed Aug. 15, 2011, Donnelly et al.
U.S. Appl. No. 13/215,026, filed Aug. 22, 2011, Donnelly et al.
U.S. Appl. No. 13/281,702, filed Oct. 26, 2011, Kesseli et al.
U.S. Appl. No. 13/281,725, filed Oct. 26, 2011, Dewis et al.
U.S. Appl. No. 61/501,552, filed Jun. 27, 2011, Kesseli et al.
Background of the Invention for the above-captioned application (previously provided).
"A High-Efficiency ICR Microturbine for Commercial Vehicle Propulsion," PACCAR, date unknown, 11 pages.
"Analysis of Technology Options to Reduce the Fuel Consumption of Idling Trucks," Stodolsky, F., L. Gaines, and A. Vyas, Argonne National Laboratory, ANL/ESD-43, Jun. 2000, 40 pages.
"Benefits of the Microturbine to Power the Next Generation of Trucks." Kenworth Truck Company, date unknown, 9 pages.
"Why Gas Turbines have a Future in Heavy Duty Trucks." Capstone Turbine Corporation, Brayton Energy, LLC, Kenworth Truck Company, a PACCAR Company, Peterbilt Truck Company, a PACCAR Company, Apr. 2009, 10 pages.
Balogh et al. "DC Link Floating for Grid Connected PV Converters," World Academy of Science, Engineering and Technology Apr. 2008, Iss. 40, pp. 115-120.
Mackay et al. "High Efficiency Vehicular Gas Turbines," SAE International, 2005, 10 pages.
Wolf et al. "Preliminary Design and Projected Performance for Intercooled-Recuperated Microturbine," Proceedings of the ASME TurboExpo 2008 Microturbine and Small Turbomachinery Systems, Jun. 9-13, 2008, Berlin, Germany, 10 pages.
Official Action for Australian Patent Application No. 2011295668 dated May 9, 2013, 2 pages.
Nemeth et al., "Life Predicted in Probabilistic Design Space for Brittle Materials With Transient Loads," NASA, last updated Jul. 21, 2005, found at http://www.grc.nasa.gov/WWW/RT/2004/RS/RS06L-nemeth.html, 5 pages.
International Search Report for International (PCT) Patent Application No. PCT/US2011/050543, mailed Feb. 21, 2012, 2 pages.
Written Opinion for International (PCT) Patent Application No. PCT/US2011/050543, mailed Feb. 21, 2012, 6 pages.
International Preliminary Report on Patentability for International (PCT) Patent Application No. PCT/US2011/050543, mailed Mar. 14, 2013, 8 pages.

GAS TURBINE ENGINE CONFIGURATIONS

CROSS REFERENCE TO RELATED APPLICATION

The present application claims the benefits, under 35 U.S.C. §119(e), of U.S. Provisional Application Ser. No. 61/380,018 entitled "Gas Turbine Engine Configurations" filed on Sep. 3, 2010 and U.S. Provisional Application Ser. No. 61/406,818 entitled "Gas Turbine Engine Configurations" filed on Oct. 26, 2010, both of which are incorporated herein by reference.

FIELD

The present invention relates generally to gas turbine engine systems and specifically to physical packaging of gas turbine engines components to optimize power density, more readily integrate with other equipment and facilitate maintenance.

BACKGROUND

In the search for efficient engine and fuel strategies, many different power plant and power delivery strategies have been investigated. The gas turbine or Brayton cycle power plant has demonstrated many attractive features which make it a candidate for advanced vehicular propulsion and power generation. Gas turbine engines have the advantage of being highly fuel flexible and fuel tolerant. Additionally, these engines burn fuel at a lower temperature than reciprocating engines so produce substantially less NOxs per mass of fuel burned.

An engine must be fit into the vehicle's engine compartment and be mated to the vehicle's transmission system. A Class 8 vehicle will have substantially different packaging requirements than a Class 5 delivery vehicle, an SUV or a pick-up truck for example.

For power generation, packaging requirements are different from those of a vehicle and an engine must be packaged along with power electronics, often in settings that require the engine or engines to fit more efficiently in confined spaces.

In both vehicle and power generation applications, multiple engine configurations may be used. For example, 2 or more engines may be packaged to provide a power plant for a locomotive. Two or more smaller engines (in the range of about 200 kW to about 1,000 kW at full power) may be packaged to provide back-up power for a multi-megawatt renewable power generating facility.

There remains a need for a versatile engine design whose components can be arranged to fit the packaging requirements of various vehicles from small cars and trucks to large trucks and for various power generation applications from back-up power generation to large on-line power generation applications such as converting large renewable power facilities into dispatchable power plants. This need applies to both single engine and multiple engine applications.

SUMMARY

These and other needs are addressed by the present invention. In a single engine configuration, the present invention is directed to dense packaging of turbomachinery by means of close-coupling of components and by the ability to rotate various engine components with respect to other engine components. In addition, spool shaft rotational direction may be reversed to suit the application. In multiple engine configurations, the same ability to close-couple and rotate components and to reverse shaft rotational direction in order to rearrange the engine geometry package is used for packaging two or more gas turbine engines to achieve high power density. A key point is that the engines can be dense-packed because of a number of features of the basic engine. The primary features are 1) the use of compact centrifugal compressors and radial turbine assemblies, 2) the close coupling of turbomachinery for a dense packaging, 3) the ability to rotate certain key components so as to facilitate ducting and preferred placement of other components, 4) the ability to control spool shaft rotational direction and 5) full power operation at high overall pressure ratios (typically in the range of about 10:1 to about 20:1).

Depending on integration requirements, the turbomachinery can be packaged to permit access to the different gas streams throughout the cycle for various purposes. For example, a portion of inter-stage flow may be bled for direct use such as cooling of components, bearings etcetera. The components of the turbine can be interconnected in such a way to preferably position the turbomachinery adjacent to the required access point for power take-off By careful selection of turbomachinery direction of rotation the orientation of components can be optimized for a given package, installation or integration.

In one embodiment, a gas turbine engine is disclosed comprising at least first and second turbo-compressor spools, each of the at least first and second turbo-compressor spools comprising a centrifugal compressor in mechanical communication with a radial turbine; at least one intercooler positioned in a fluid path between the first and second turbo-compressor spools; a recuperator operable to transfer thermal energy from an output gas of a power turbine to a compressed gas produced by the at least first and second turbo-compressor spools and thereby form a further heated gas; and a combustor operable to combust a fuel in the presence of the further heated gas, wherein the combustor is substantially contained within a volume occupied by the recuperator.

In another embodiment, a gas turbine engine is disclosed comprising at least first and second turbo-compressor spools, each of the at least first and second turbo-compressor spools comprising a centrifugal compressor in mechanical communication with a radial turbine; at least one intercooler positioned in a fluid path between the first and second turbo-compressor spools; a recuperator operable to transfer thermal energy from an output gas of a power turbine to a compressed gas produced by the at least first and second turbo-compressor spools and thereby form a further heated gas; and a combustor operable to combust a fuel in the presence of the further heated gas; wherein a ratio of a gas pressure in the combustor to a gas turbine engine inlet air pressure ranges from about 10:1 to about 20:1.

In yet another embodiment, a gas turbine engine is disclosed comprising at least first and second turbo-compressor spools, each of the at least first and second turbo-compressor spools comprising a centrifugal compressor in mechanical communication with a radial turbine; at least one intercooler positioned in a fluid path between the first and second turbo-compressor spools; a recuperator operable to transfer thermal energy from an output gas of a power turbine to a compressed gas produced by the at least first and second turbo-compressor spools and thereby form a further heated gas; and a combustor operable to combust a fuel in the presence of the further heated gas, wherein a power-per-unit volume for a spatial volume occupied by the gas turbine engine is at least about 175 kW/m3 and wherein a power-per-unit weight for the gas turbine engine is at least about 0.5 kW/kg.

A generator assembly is disclosed wherein the generator is operable to engage a gas turbine engine such as disclosed herein, the generator assembly comprising a plurality of generators, each generator being mechanically connected to a corresponding set of a bull gear and pinion, in each corresponding set the bull gear being mechanically connected to the respective generator and the pinion being mechanically connected to the bull gear and a bull gear mechanically connected to an output shaft of a power turbine of the gas turbine engine, whereby rotation of the output shaft rotates, substantially simultaneously, each of the corresponding sets of a bull gear and pinion. Each of the generators has an output power range of from about 80 to about 250 kW and the power turbine has an output power in the range of from about 300 to about 1,000 kW.

A reducing gearbox arrangement is disclosed wherein the reducing gearbox is mechanically positioned between a power turbine output shaft and an input shaft to the transmission or electrical generator, the reducing gearbox comprising at least one of a single gear reduction set, a double gear reduction set and an epicyclic planetary gear set, whereby the output shaft of the power turbine and input shaft to the transmission enter on the same side of the reducing gearbox so that the transmission is folded back under the power turbine.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

DC bus means DC link and the terms may be used interchangeably.

A drive train is the part of a vehicle or power generating machine that transmits power from the engine to the driven members, such as the wheels on a vehicle, by means of any combination of belts, fluids, gears, flywheels, electric motors, clutches, torque converters, shafts, differentials, axles and the like.

An energy storage system refers to any apparatus that acquires, stores and distributes mechanical or electrical energy which is produced from another energy source such as a prime energy source, a regenerative braking system, a third rail and a catenary and any external source of electrical energy. Examples are a battery pack, a bank of capacitors, a pumped storage facility, a compressed air storage system, an array of a heat storage blocks, a bank of flywheels or a combination of storage systems.

An engine is a prime mover and refers to any device that uses energy to develop mechanical power, such as motion in some other machine. Examples are diesel engines, gas turbine engines, microturbines, Stirling engines and spark ignition engines.

A free power turbine as used herein is a turbine which is driven by a gas flow and whose rotary power is the principal mechanical output power shaft. A free power turbine is not connected to a compressor in the gasifier section, although the free power turbine may be in the gasifier section of the gas turbine engine. A power turbine may also be connected to a compressor in the gasifier section in addition to providing rotary power to an output power shaft.

Jake brake or Jacobs brake describes a particular brand of engine braking system. It is used generically to refer to engine brakes or compression release engine brakes in general, especially on large vehicles or heavy equipment. An engine brake is a braking system used primarily on semi-trucks or other large vehicles that modifies engine valve operation to use engine compression to slow the vehicle. They are also known as compression release engine brakes.

A mechanical-to-electrical energy conversion device refers an apparatus that converts mechanical energy to electrical energy or electrical energy to mechanical energy. Examples include but are not limited to a synchronous alternator such as a wound rotor alternator or a permanent magnet machine, an asynchronous alternator such as an induction alternator, a DC generator, and a switched reluctance generator. A traction motor is a mechanical-to-electrical energy conversion device used primarily for propulsion.

A prime power source refers to any device that uses energy to develop mechanical or electrical power, such as motion in some other machine. Examples are diesel engines, gas turbine engines, microturbines, Stirling engines, spark ignition engines and fuel cells.

A power control apparatus refers to an electrical apparatus that regulates, modulates or modifies AC or DC electrical power. Examples are an inverter, a chopper circuit, a boost circuit, a buck circuit or a buck/boost circuit.

Power density as used herein is power per unit volume (watts per cubic meter).

A recuperator as used herein is a gas-to-gas heat exchanger dedicated to returning exhaust heat energy from a process back into the pre-combustion process to increase process efficiency. In a gas turbine thermodynamic cycle, heat energy is transferred from the turbine discharge to the combustor inlet gas stream, thereby reducing heating required by fuel to achieve a requisite firing temperature.

Regenerative braking is the same as dynamic braking except the electrical energy generated during braking is captured and stored in an energy storage system for future use.

Specific power as used herein is power per unit mass (watts per kilogram).

Spool means a group of turbo machinery components on a common shaft. A turbo-compressor spool is a spool comprised of a compressor and a turbine connected by a shaft. A free power turbine spool is a spool comprised of a turbine and a turbine power output shaft.

Thermal efficiency as used herein is shaft output power (J/s) of an engine divided by flow rate of fuel energy (J/s), wherein the fuel energy is based on the low heat value of the fuel.

A thermal energy storage module is a device that includes either a metallic heat storage element or a ceramic heat storage element with embedded electrically conductive wires. A thermal energy storage module is similar to a heat storage block but is typically smaller in size and energy storage capacity.

A traction motor is a motor used primarily for propulsion such as commonly used in a locomotive. Examples are an AC or DC induction motor, a permanent magnet motor and a switched reluctance motor.

A turbine is any machine in which mechanical work is extracted from a moving fluid by expanding the fluid from a higher pressure to a lower pressure.

Turbine Inlet Temperature (TIT) as used herein refers to the gas temperature at the outlet of the combustor which is closely connected to the inlet of the high pressure turbine and these are generally taken to be the same temperature.

A turbo-compressor spool assembly as used herein refers to an assembly typically comprised of an outer case, a radial compressor, a radial turbine wherein the radial compressor and radial turbine are attached to a common shaft. The assembly also includes inlet ducting for the compressor, a compressor rotor, a diffuser for the compressor outlet, a volute for incoming flow to the turbine, a turbine rotor and an outlet diffuser for the turbine. The shaft connecting the compressor and turbine includes a bearing system.

As used herein, any engine output shaft power or range of output shaft powers means at full power operating conditions unless specifically stated otherwise.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention. In the drawings, like reference numerals refer to like or analogous components throughout the several views

DETAILED DESCRIPTION

Figure 1:
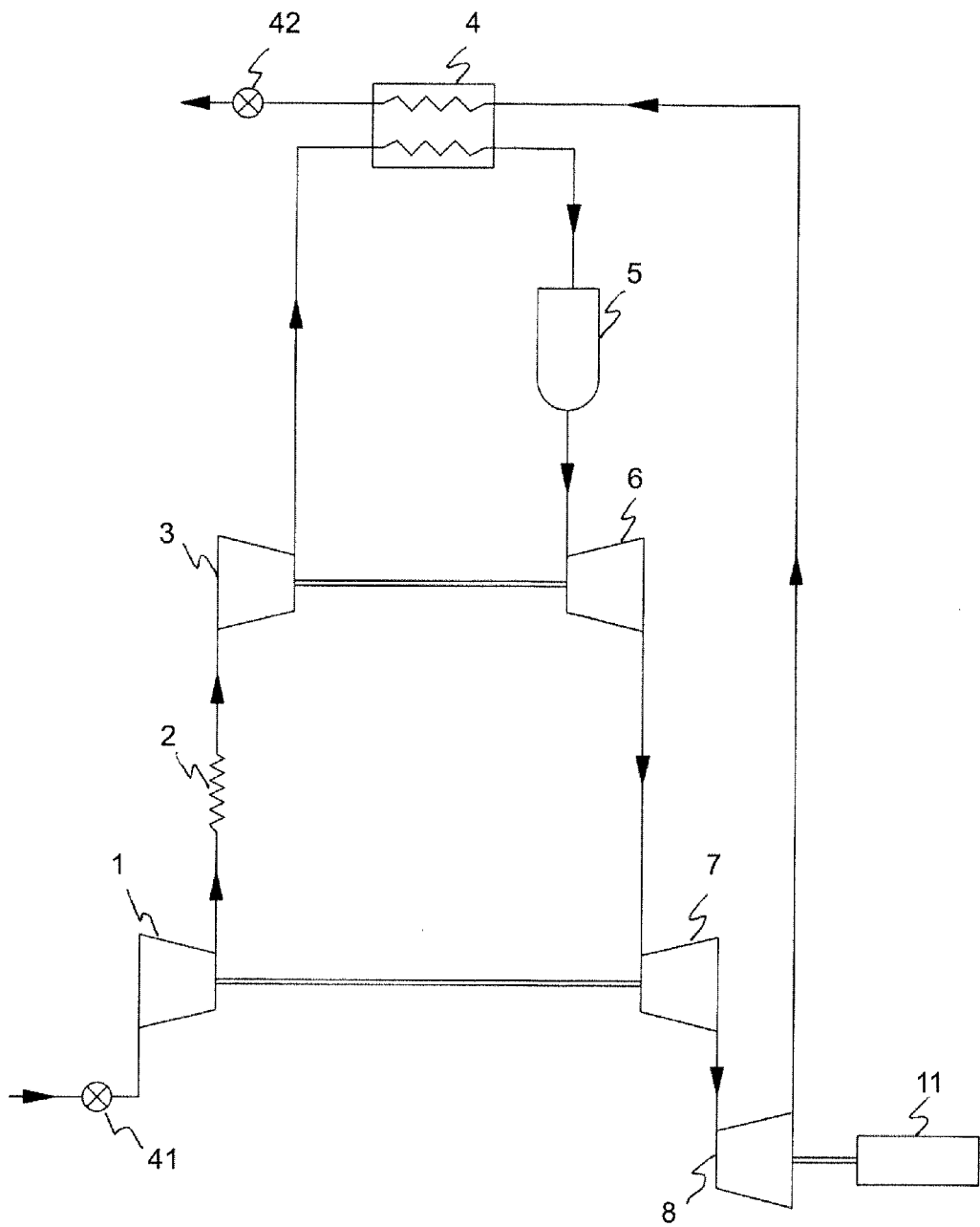
FIG. 1 is prior art schematic of the component architecture of a multi-spool gas turbine engine.

In the present invention, a preferred method of packaging a single engine or two or more gas turbine engines is disclosed. A key point is that the engines can be dense-packed because of a number of features of the basic engine. The primary features are 1) the use of compact centrifugal compressors and radial turbine assemblies, 2) the close coupling of turbomachinery for a dense packaging, 3) the ability to rotate certain key components so as to facilitate ducting and preferred placement of other components, 4) the ability to control spool shaft rotational direction and 5) full power operation at high overall pressure ratios (typically in the range of about 10:1 to about 20:1). These features can be utilized dense pack single or multiple engines.

The basic engine used herein to illustrate packing is an approximately 375 kW gas turbine engine. As can be appreciated, the same packing principles can be applied to gas turbine engines in the power range of about 10 kW to about 1,000 kW.

The features that allow dense packing include:

the use of compact centrifugal compressors and radial turbine assemblies full power operation at a high compression ratio of about 10:1 to about 20:1 which permits the use of smaller components to achieve the desired mass flow rate an innovative compact recuperator design which is typically a large component in prior art gas turbines. Such a recuperator design is described in U.S. patent application Ser. No. 12/115,069 filed May 5, 2008, entitled "Heat Exchange Device and Method for Manufacture" and U.S. patent application Ser. No. 12/115,219 filed May 5, 2008, entitled "Heat Exchanger with Pressure and Thermal Strain Management", both of which are incorporated herein by reference. These recuperators can be operated at temperatures up to about 1,000 K and pressure differentials of about 10:1 to about 20:1 where the pressure differential is between the hot and cold sides of the recuperator.

nesting the combustor within the recuperator assembly all three turbomachinery modules or spools (typically a turbo-compressor spool is a spool comprised of a compressor and a turbine connected by a shaft. A free power turbine spool is a spool comprised of a turbine and a turbine power output shaft.) are arranged so that they can be connected with a minimum of ducting so that the overall engine is very compact.

the ability to rotate the compressor and turbine independently on a turbo-compressor spool. For example, the inlet flow to a centrifugal compressor is in the direction of its axis while the output flow is through a volute/diffuser which is at right angles to the axis and which can be rotated about the axis to direct the output flow in any desired direction. For example, the outlet flow from a radial turbine is in the direction of its axis while the input flow is thru a volute/scroll which is at right angles to the axis and which can be rotated about the axis to receive the input flow from any desired direction.

the ability to control spool shaft rotational direction by changing the rotors in the spools turbine and, if used, the spool's compressor.

In power generation applications, a Capstone C 1000 microturbine system is a typical prior art system which provides 1 MW of power output in a power generating system contained in a 30 foot long ISO container. With the packaging scheme of the present invention, a gas turbine power generating system contained in a 20 foot long ISO container and which can provide power output in the range of about 1 MW to about 2 MW is disclosed. ISO containers are containers of specific cross section dimensions. The cross section is constant for ISO containers in the length range of 20 to 40 feet and is approximately 8 feet by 8 feet.

Preferable Engine

A preferable engine type is a high-efficiency gas turbine engine because it typically has lower NOx emissions, is more fuel flexible and has lower maintenance costs. For example, an intercooled recuperated gas turbine engine in the range of about 10 kW to about 1,000 kW is feasible with thermal efficiencies above about 40%. A schematic of an intercooled recuperated gas turbine engine is shown in FIG. 1.

FIG. 1 is prior art schematic of the component architecture of a multi-spool gas turbine engine. Gas is ingested into a low pressure compressor 1. The outlet of the low pressure compressor 1 passes through an intercooler 2 which removes a portion of heat from the gas stream at approximately constant pressure. The gas then enters a high pressure compressor 3. The outlet of high pressure compressor 3 passes through a recuperator 4 where some heat from the exhaust gas is transferred, at approximately constant pressure, to the gas flow from the high pressure compressor 3. The further heated gas from recuperator 4 is then directed to a combustor 5 where a fuel is burned, adding heat energy to the gas flow at approximately constant pressure. The gas emerging from the combustor 5 then enters a high pressure turbine 6 where work is done by the turbine to operate the high pressure compressor 3. The gas from the high pressure turbine 6 then drives a low pressure turbine 7 where work is done by the turbine to operate the low pressure compressor 1. The gas from the low pressure turbine 7 then drives a free power turbine 8. The shaft of the free power turbine, in turn, drives a transmission 11 which may be an electrical, mechanical or hybrid transmission for a vehicle. Alternately, the shaft of the free power turbine can drive an electrical generator or alternator. This engine design is described, for example, in U.S. patent application Ser. No. 12/115,134 filed May 5, 2008, entitled "Multi-Spool Intercooled Recuperated Gas Turbine", which is incorporated herein by this reference.

As can be appreciated, this basic engine architecture can be modified by adding reheaters either after the high pressure turbine or after the low pressure turbine or both and by adding additional turbo-compressor spools and intercooling apparatuses. Such an engine architecture is described, for example, in U.S. Provisional Application No. 61/501,552, filed Jun. 27, 2011 entitled "Advanced Cycle Gas Turbine Engine" which is incorporated herein by reference. The basic engine architecture can also be modified by adding thermal energy storage devices within the pressure boundary of the engine. Such additions are described in U.S. patent application Ser. No. 12/777,916 filed May 11, 2010 entitled "Gas Turbine Energy Storage and Conversion System", which is incorporated herein by reference. The basic engine architecture can be further modified by adding motor/generators to one of more of the turbo-compressor spools such as described in U.S. patent application Ser. No. 13/175,564 filed Jul. 1, 2011, entitled "Improved Multi-spool Intercooled Recuperated Gas Turbine", which is incorporated herein by reference.

The gas turbine engines described herein typically comprise at least one major component fabricated from a ceramic material such as alumina, silicon carbide, silicon nitride and the like. Major components that may be fabricated from ceramic materials include, for example, the combustor, any reheaters and any of the turbine rotors, rotor shrouds and volutes.

FIGS. 2 through 12 illustrate various gas turbine engine configurations that may be used either in vehicular applications or in power generation applications.

FIGS. 13 through 16 illustrate examples of close coupled components and components that can be rotated to facilitate dense packaging or packaging requirements dictated by unusual engine compartment configurations.

Figure 2:
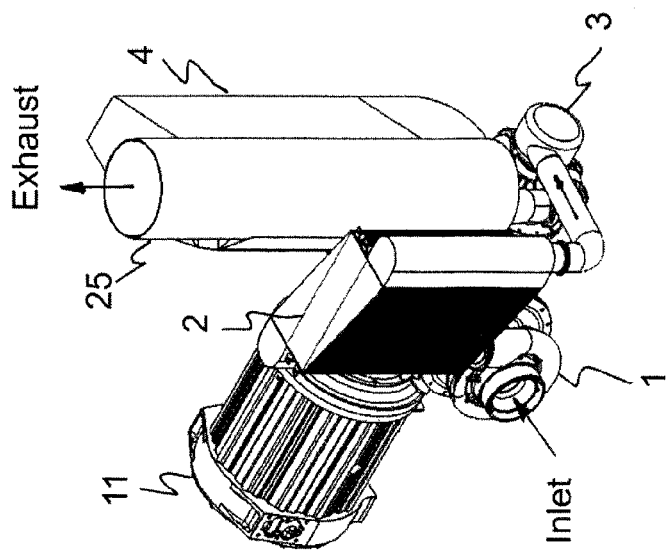
FIG. 2 is an isometric view of a gas turbine engine with horizontal transmission.

FIG. 2 is an isometric view of a gas turbine engine with horizontal output load assembly which may be, for example, a transmission or high speed electrical generator. The latter can be any one of a number of mechanical-to-electrical energy conversion devices defined in the Summary. This view shows air inlet to low pressure centrifugal compressor 1, intercooler 2, high pressure centrifugal compressor 3 and recuperator 4. The combustor is contained within recuperator 4. The exhaust from the hot side of recuperator 4 is expelled to the atmosphere via stack 25. This arrangement illustrates one embodiment of directly coupled turbomachinery to make a compact arrangement. Output load assembly 11 is shown as horizontal in this configuration.

Figure 3:
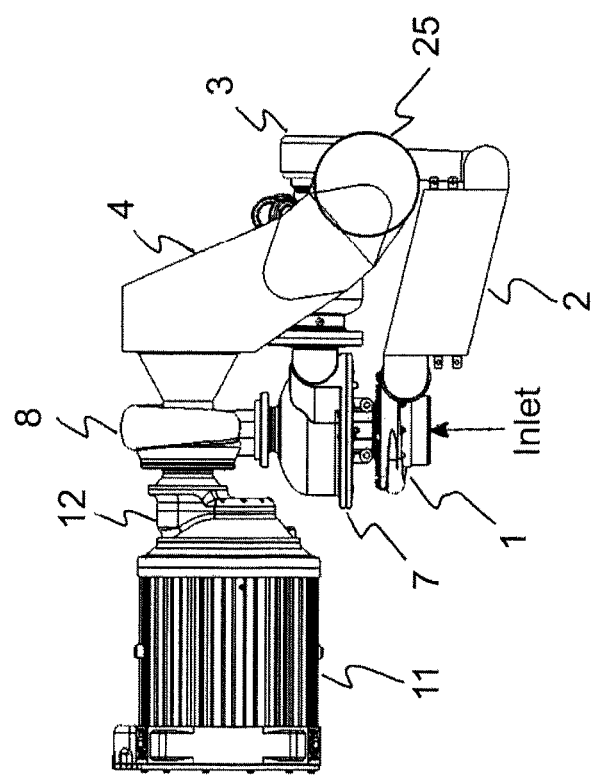
FIG. 3 is a plan view of a gas turbine engine with horizontal transmission.

FIG. 3 is a plan view of a gas turbine engine of FIG. 2 with horizontal output load assembly. This view shows air inlet to low pressure centrifugal compressor 1, intercooler 2, high pressure radial turbine 7, high pressure centrifugal compressor 3, recuperator 4, recuperator exhaust stack 25 and radial free power turbine 8. The output shaft of free power turbine 8 is connected to a reducing gear in gearbox 12 which, in turn, is connected to output load assembly 11.

Figure 4:
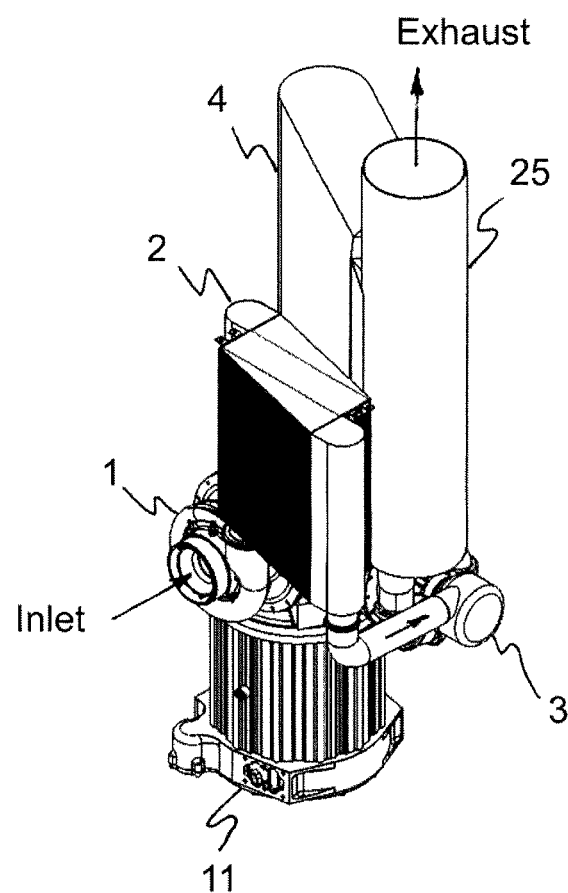
FIG. 4 is an isometric view of a gas turbine engine with vertical transmission.

FIG. 4 is an isometric view of a gas turbine engine with vertical output load assembly which may be, for example, a transmission or high speed electrical generator. This view shows air inlet to low pressure centrifugal compressor 1, intercooler 2, high pressure centrifugal compressor 3 and recuperator 4. The combustor is contained within recuperator 4. The exhaust from the hot side of recuperator 4 is expelled to the atmosphere via stack 25 in a hot air pipe. This arrangement illustrates one embodiment of directly coupled turbomachinery to make a compact arrangement. Output load assembly 11 is shown as vertical in this configuration.

Figure 5:
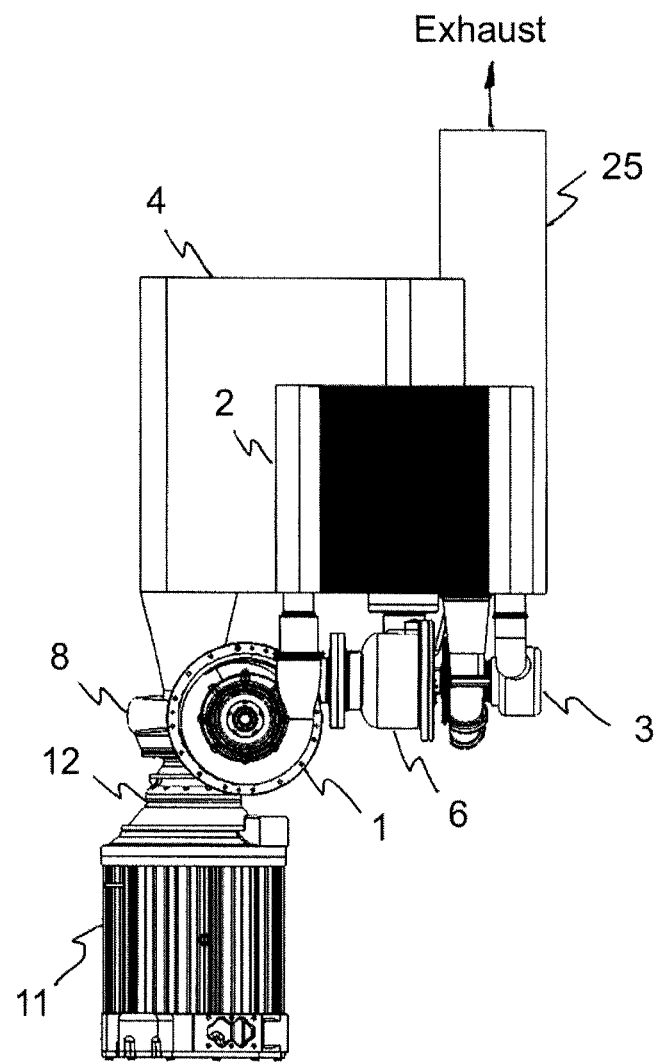
FIG. 5 is a side view of a gas turbine engine with vertical transmission.

FIG. 5 is a side view of a gas turbine engine of FIG. 4 with vertical output load assembly. This view shows low pressure centrifugal compressor 1, intercooler 2, high pressure centrifugal compressor 3, recuperator 4, recuperator exhaust stack 25, high pressure radial turbine 6 and radial free power turbine 8. The output shaft of free power turbine 8 is connected to a reducing gear in gearbox 12 which, in turn, is connected to output load assembly 11.

Figure 6:
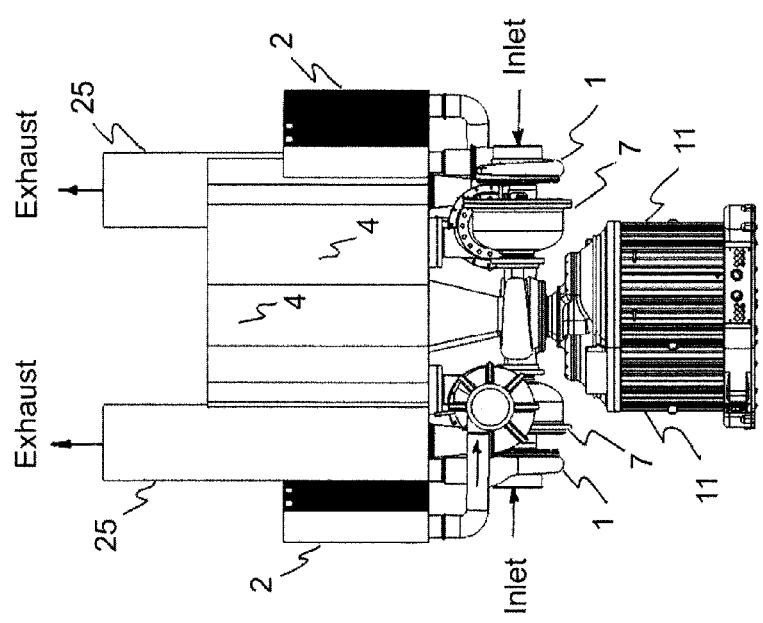
FIG. 6 is a front view of two nested gas turbine engines with vertical transmissions.

FIG. 6 is a front view of two nested gas turbine engines with vertical output load assemblies. This view shows air inlets to two low pressure centrifugal compressors 1, two intercoolers 2, two low pressure radial turbines 7, two recuperators 4 and two radial free power turbines 8. The two combustors are contained within the two recuperators 4. This arrangement illustrates one configuration of directly coupled turbomachinery to make a compact arrangement. The output shafts of the two free power turbines are connected to gearboxes which, in turn, are connected to two output load assemblies 11.

Figure 7:
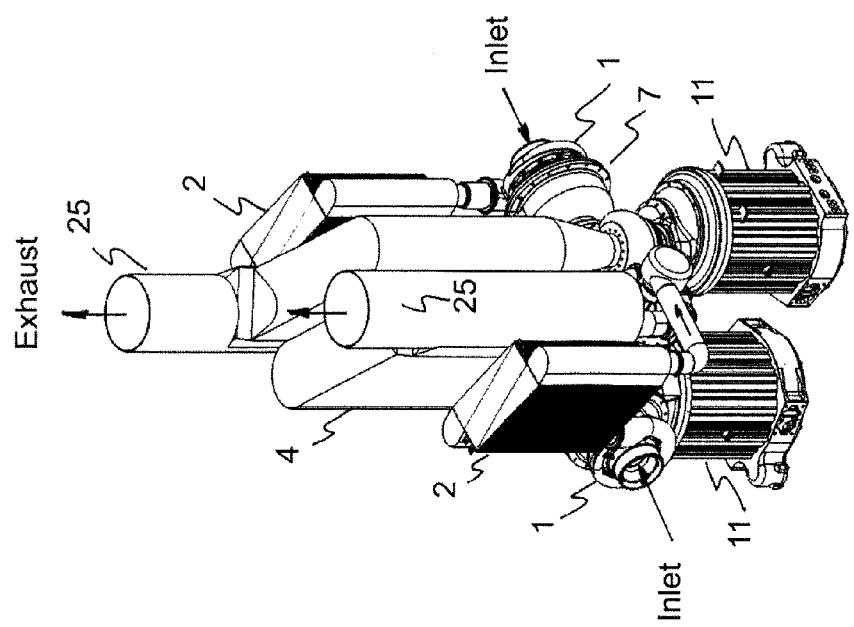
FIG. 7 is an isometric view of two nested gas turbine engines with vertical transmissions.

FIG. 7 is an isometric view of two nested gas turbine engines of FIG. 6 with vertical output load assemblies. This view shows air inlets to two low pressure centrifugal compressors 1, two intercoolers 2, one of the low pressure radial turbines 7, two recuperators 4. The two combustors are contained within the two recuperators 4. Two output load assemblies 11 are shown as vertical in this configuration.

Figure 8:
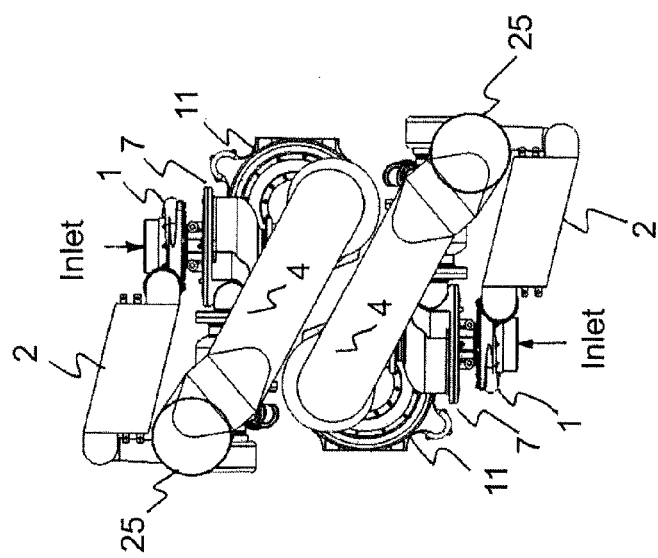
FIG. 8 is a plan view of two nested gas turbine engines with vertical transmissions.

FIG. 8 is a plan view of two nested gas turbine engines of FIG. 6 with vertical output load assemblies. This view shows air inlets to two low pressure centrifugal compressors 1, two intercoolers 2, two low pressure radial turbines 7, two recuperators 4 and recuperator exhaust stacks 25. The two radial free power turbines are not visible in this view. The bottom of two output load assemblies 11 are just visible. This view perhaps best shows how the two engines can be nested with their recuperators 4 positioned side by side.

Figure 9:
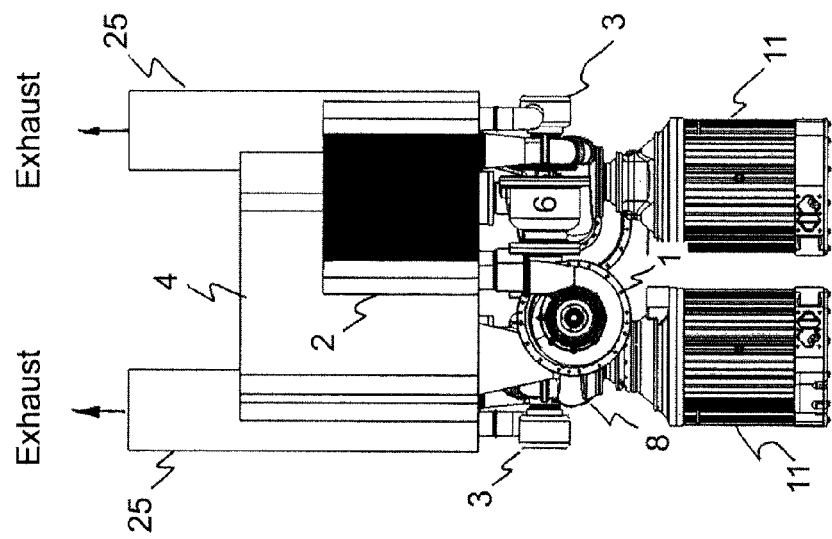
FIG. 9 is a side view of two nested gas turbine engines with vertical transmissions.

FIG. 9 is a side view of two nested gas turbine engines of FIG. 6 with vertical output load assemblies. This view shows one of the two low pressure centrifugal compressors 1, one of the two intercoolers 2, two high pressure centrifugal compressors 3, one of the two high pressure radial turbines 6, one of the two recuperators 4, two recuperator exhaust stacks and one of the two radial free power turbines 8. The output shaft of both free power turbines 8 are connected to gearboxes which, in turn, are connected to two output load assemblies 11.

Figure 10:
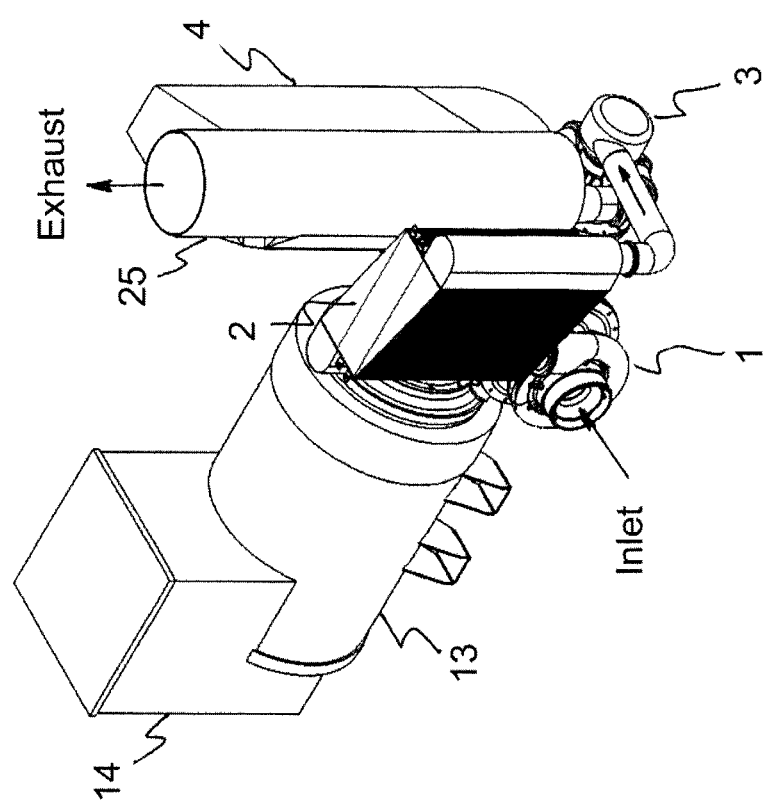
FIG. 10 is an isometric view of a gas turbine engine with horizontal alternator.

FIG. 10 is an isometric view of a gas turbine engine with horizontal alternator. This view shows air inlet to low pressure centrifugal compressor 1, intercooler 2, high pressure centrifugal compressor 3 and recuperator 4. The combustor is contained within recuperator 4 in a hot air pipe. Alternator 13 and its electronics control box 14 are shown as horizontal in this configuration.

Figure 11:
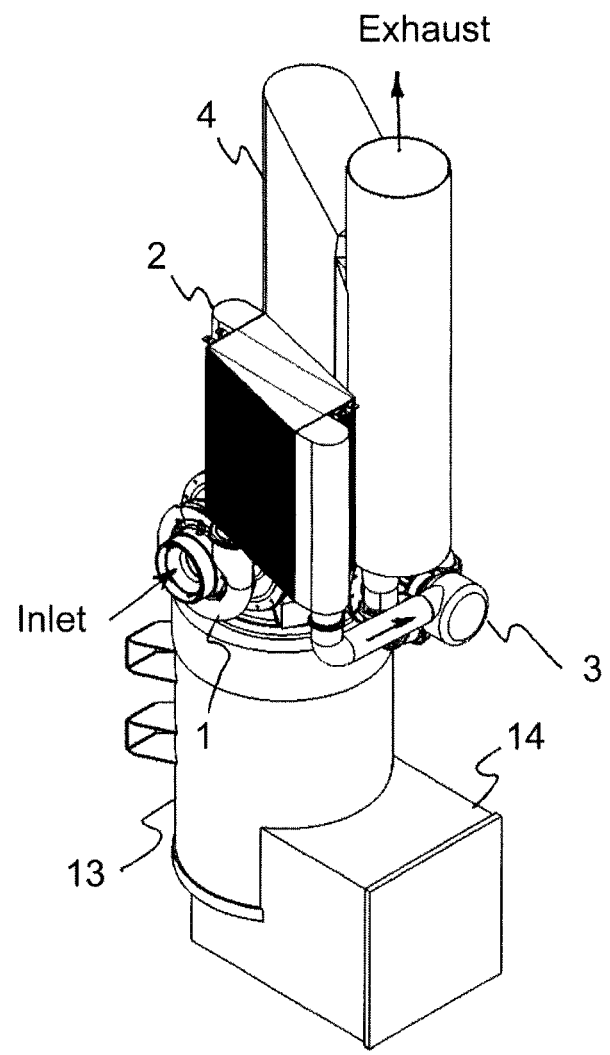
FIG. 11 is an isometric view of a gas turbine engine with vertical alternator.

FIG. 11 is an isometric view of a gas turbine engine with a vertical alternator. This view shows air inlet to low pressure centrifugal compressor 1, intercooler 2, high pressure centrifugal compressor 3 and recuperator 4. The combustor is contained within recuperator 4. Alternator 13 and its electronics control box 14 are shown as vertical in this configuration.

Figure 12:
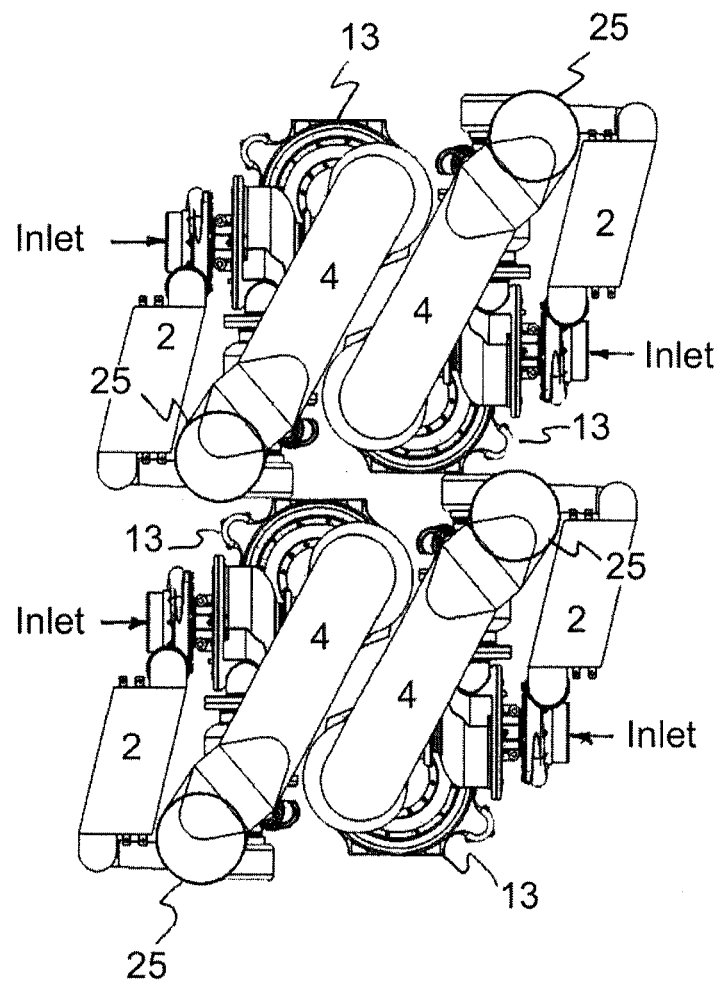
FIG. 12 is a plan view of four nested gas turbine engines with vertical transmissions.

FIG. 12 is a plan view of four nested gas turbine engines with vertical output load assemblies. This view shows air inlets to four low pressure centrifugal compressors 1, four intercoolers 2, four recuperators 4 and four recuperator exhaust stacks 25. The four radial free power turbines are not visible in this view. The bottom of four output load assemblies 11 are just visible. This view best shows how four engines can be nested with pairs of their recuperators 4 positioned side by side.

The following four figures, taken together, illustrate how centrifugal compressors and their corresponding radial turbines may be arranged to minimize the length of connecting duct work (close-coupled) and to be reconfigurable (rotatable) to allow the other major components of the engine, such as the intercooler, recuperator, combustor and load device to be connected in such a way as to minimize engine volume for applications such as vehicle engines and stationary power generation modules.

Figure 13:
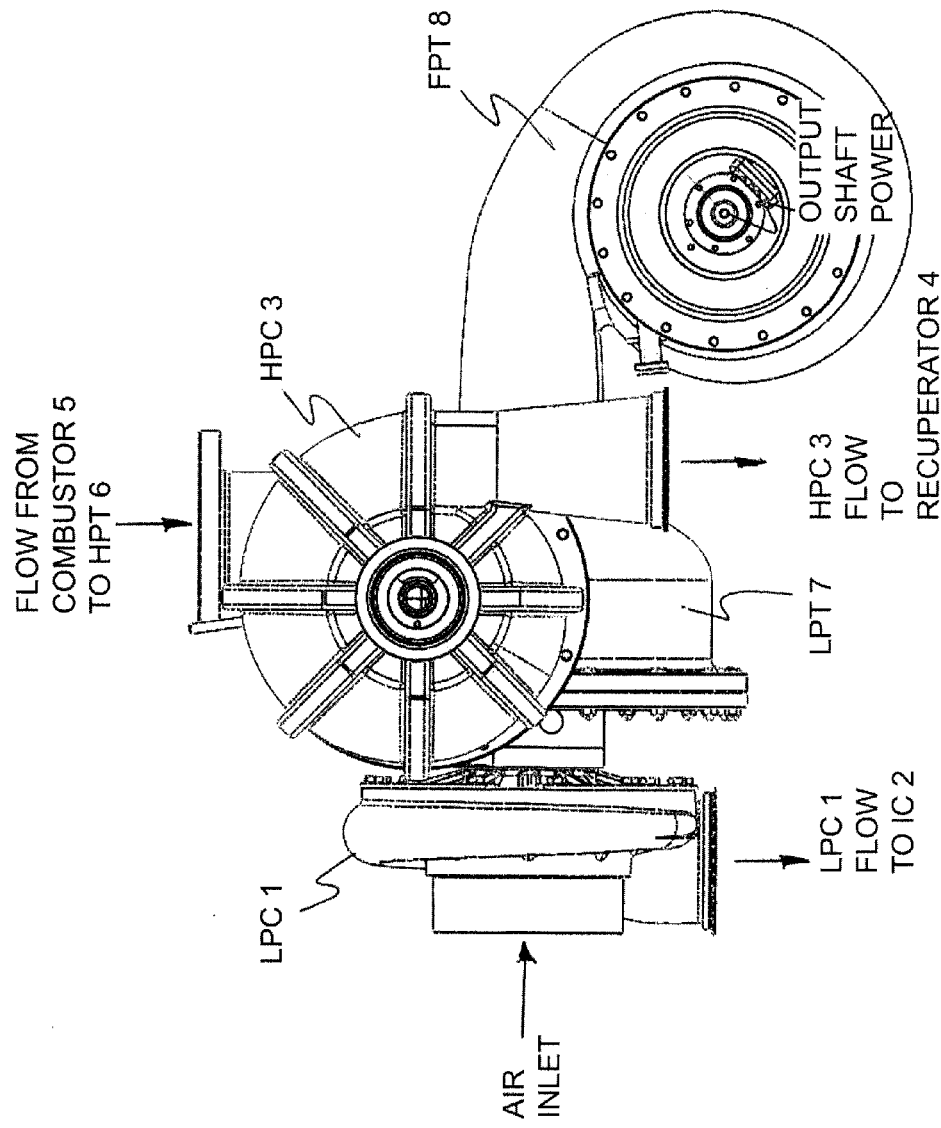
FIG. 13 is a front view of various gas turbine engine components.

FIG. 13 is a front view of various gas turbine engine components. Air (or in some engine configurations, an air-fuel mixture) enters low pressure centrifugal compressor 1 and the resulting compressed flow is sent to an intercooler (not shown in this figure but illustrated in previous figures as component 2). Flow from the intercooler enters high pressure centrifugal compressor 3 and the resulting further compressed flow is sent to the cold side of a recuperator (not shown in this figure but illustrated in previous figures as component 4). Flow from a combustor (not shown but nested in the recuperator) enters high pressure radial turbine 6, is expanded and sent to low pressure radial turbine 7 where it is further expanded and delivered to radial free power turbine 8. In this engine configuration, free power turbine 8 provides the primary mechanical shaft power of the engine.

As can be seen, the low pressure centrifugal compressor can be rotated about its axis (along the air inlet arrow) to direct its output flow in any direction over 360 degrees normal to its axis. This allows the intercooler, for example, to be placed where it is best suited for cooling. Similarly, the high pressure centrifugal compressor may be rotated about its axis so as to best direct its output flow to the recuperator or (if no recuperator is used) to the combustor. The radial free power turbine may be rotated so that its output power shaft may be in line with the load device.

Figure 14:
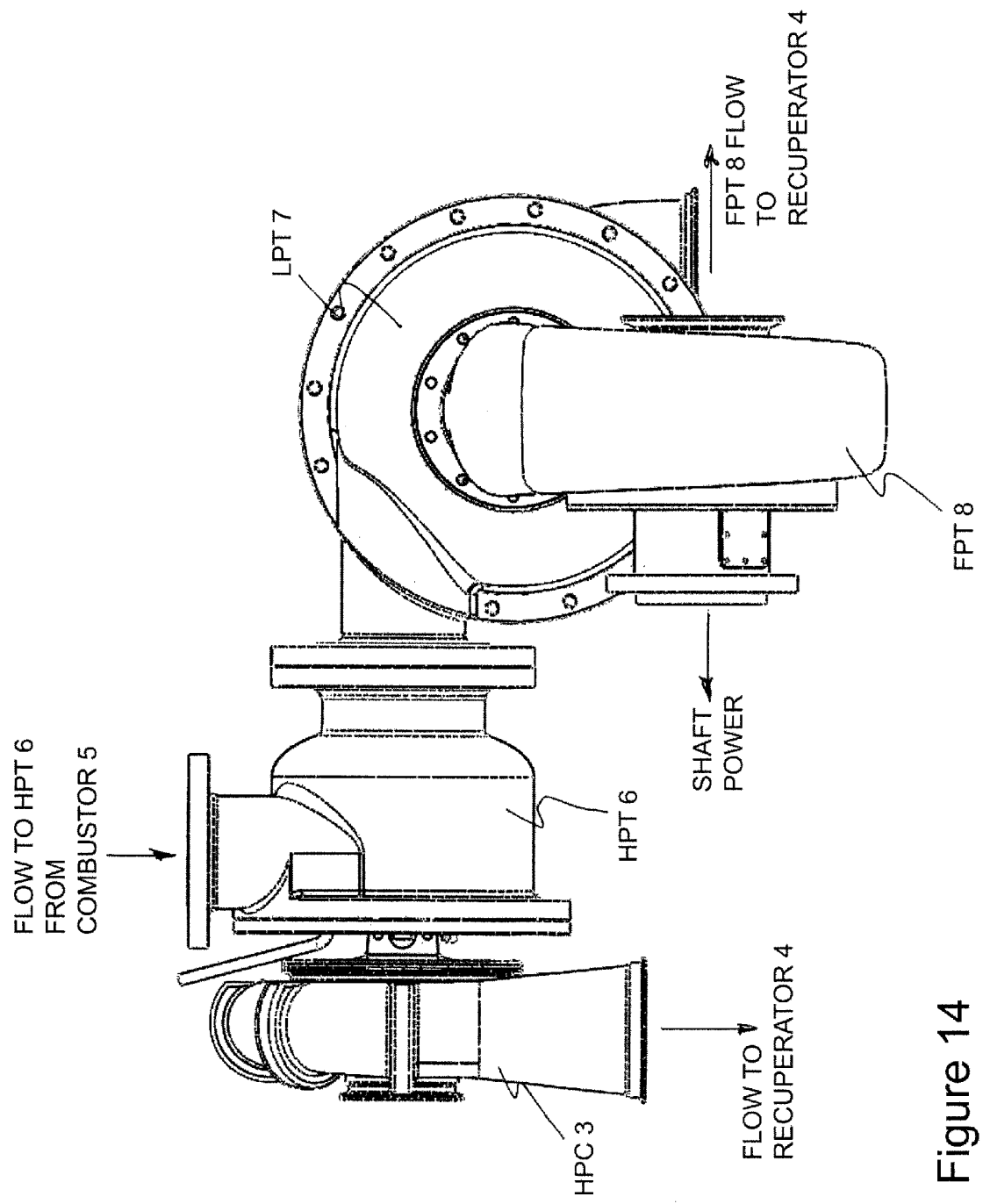
FIG. 14 is a side view of various gas turbine engine components.

FIG. 14 is a side view of various gas turbine engine components. In this view, compressed flow from high pressure centrifugal compressor 3 is sent to the cold side of a recuperator (not shown in this figure but illustrated in previous figures as component 4). Flow from a combustor (not shown but nested in the recuperator) enters high pressure radial turbine 6, is expanded and sent to low pressure radial turbine 7 where it is further expanded and delivered to radial free power turbine 8. In this engine configuration, free power turbine 8 provides the primary mechanical shaft power of the engine. The flow from radial free power turbine 8 is sent to the hot side of the recuperator (not shown in this figure but illustrated in previous figures as component 4).

Figure 15:
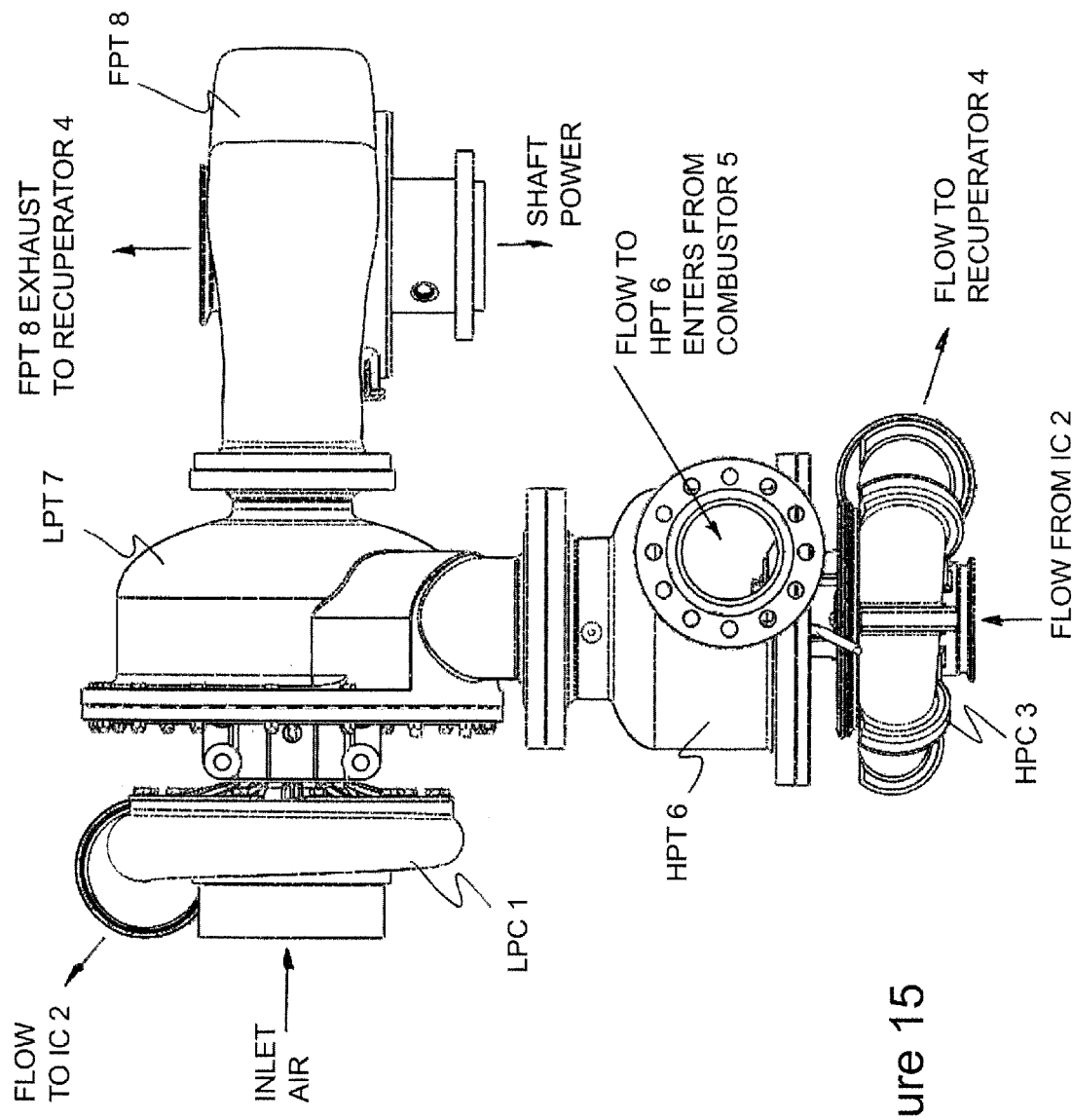
FIG. 15 is a plan view of various gas turbine engine components.

FIG. 15 is a plan view of various gas turbine engine components. The working fluid (air or in some engine configurations, an air-fuel mixture) enters low pressure centrifugal compressor 1 and the resulting compressed flow is sent to an intercooler (not shown in this figure but illustrated in previous figures as component 2). Flow from the intercooler enters high pressure centrifugal compressor 3 and the resulting further compressed flow is sent to the cold side of a recuperator (not shown in this figure but illustrated in previous figures as component 4). Flow from a combustor (not shown but nested in the recuperator) enters high pressure radial turbine 6, is expanded and sent to low pressure radial turbine 7 where it is further expanded and delivered to radial free power turbine 8. In this engine configuration, free power turbine 8 provides the primary mechanical shaft power of the engine. The flow from radial free power turbine 8 is sent to the hot side of the recuperator (not shown in this figure but illustrated in previous figures as component 4).

FIG. 15 illustrates the close coupling of components such as the low pressure turbo-compressor spool with the high pressure turbo-compressor spool and the free power turbine. Each of these spools can be rotated with respect to each other to achieve a desired packaging result.

It is noted that in preferred engine configurations, especially for vehicular applications, the combustor may be embedded inside the recuperator to efficiently utilize space. While this practice is known, it can be more effectively implemented by the ability to rotate components of the various spools and by the ability to either close couple components or connect components by short lengths of ducting.

Figure 16:
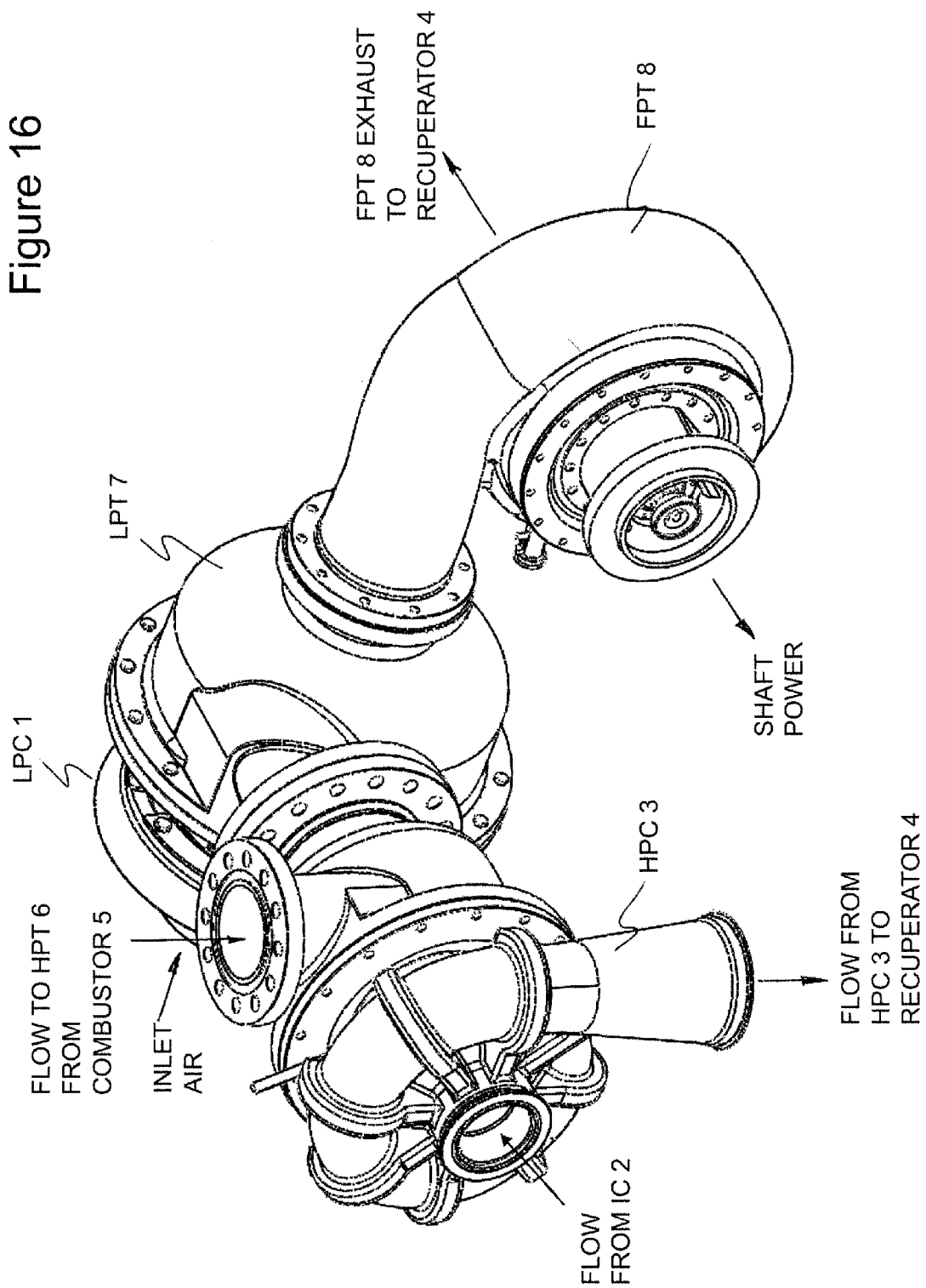
FIG. 16 is an isometric view of various gas turbine engine components.

FIG. 16 is an isometric view of various gas turbine engine components. The working fluid (air or in some engine configurations, an air-fuel mixture) enters low pressure centrifugal compressor 1 and the resulting compressed flow is sent to an intercooler (not shown in this figure but illustrated in previous figures as component 2). Flow from the intercooler enters high pressure centrifugal compressor 3 and the resulting further compressed flow is sent to the cold side of a recuperator (not shown in this figure but illustrated in previous figures as component 4). Flow from a combustor (not shown) enters high pressure radial turbine 6, is expanded and sent to low pressure radial turbine 7 where it is further expanded and delivered to radial free power turbine 8. In this engine configuration, free power turbine 8 provides the primary mechanical shaft power of the engine. The flow from radial free power turbine 8 is sent to the hot side of the recuperator (not shown in this figure but illustrated in previous figures as component 4).

As can be seen, for example, from FIG. 15, low pressure centrifugal compressor 1 can be rotated relative to the other components to vary the exit direction of the compressed flow to the intercooler (not shown). Similarly, high pressure centrifugal compressor 3 can be rotated relative to the other components to vary the inlet direction from the intercooler (not shown). High pressure radial turbine 6 can be rotated relative to the other components to vary the inlet direction from the combustor (not shown). Radial free power turbine 8 can be rotated relative to the other components to vary the direction of its outlet flow to the recuperator (not shown) and the direction of the output mechanical power shaft. This flexibility allows the other major engine components (intercooler, recuperator, combustor and load device) to be positioned where they best fit the particular engine application (for example vehicle engine, stationary power engine, nested engines and the like).

Figure 17:
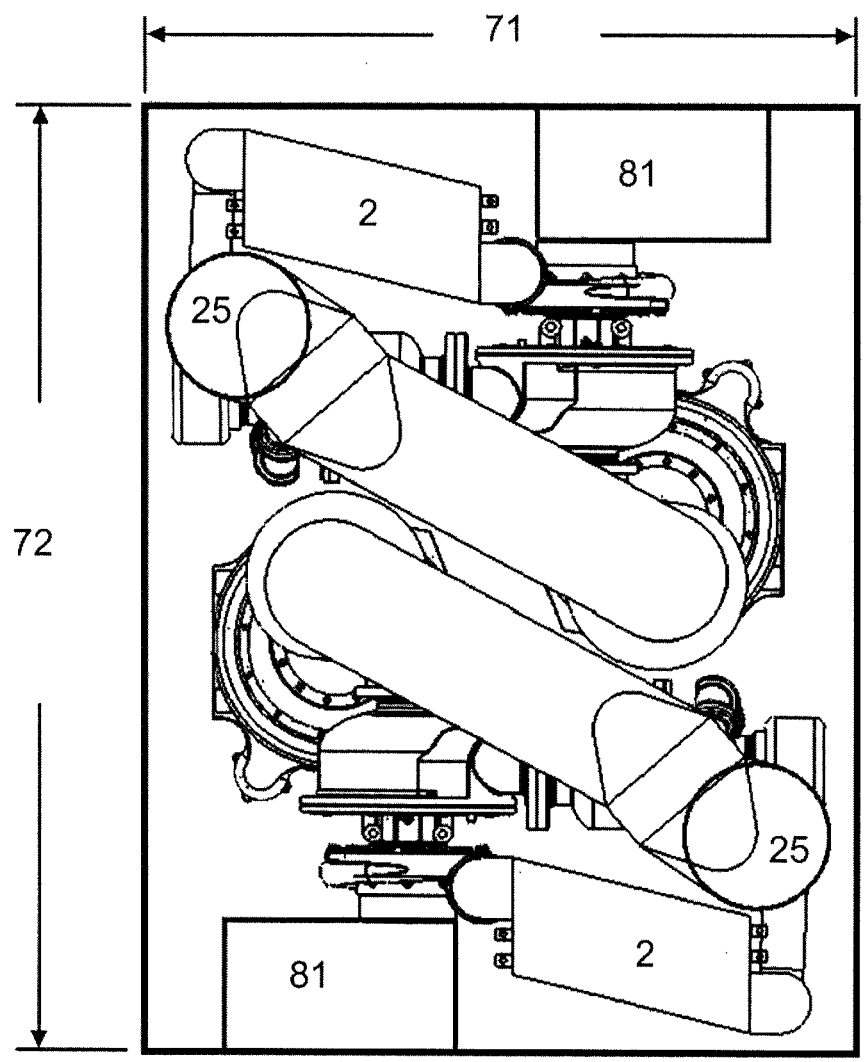
FIG. 17 is a plan view of two gas turbine engines in a container.

FIG. 17 is a plan view of two gas turbine engines in a container. This is similar to the view of FIG. 8. This figure shows two engines and their vertically connected generators in a view looking down on a container that is about 60 inches wide (dimension 71) and about 82 inches deep (dimension 72). In this example, each engine of the size shown can output power in the range of about 300 kW to about 500 kW). Inlet filters 81 are shown in front of the low pressure compressor inlets. This view also shows intercoolers 2 and exhaust stacks 25. There would be air exhaust fans in the container walls opposite each of the intercoolers 2. Power electronics for each engine would be housed in a compartment (not shown) about 36 inches wide by about 18 inches deep by about 18 inches tall. Each of the 400 kW filters are housed in containers that are also about 36 inches wide by about 18 inches deep by about 18 inches tall. Based on this arrangement, the two engines should be capable of an aggregate of about 1 MW of electrical power output from a 20 foot long ISO container.

Figure 18:
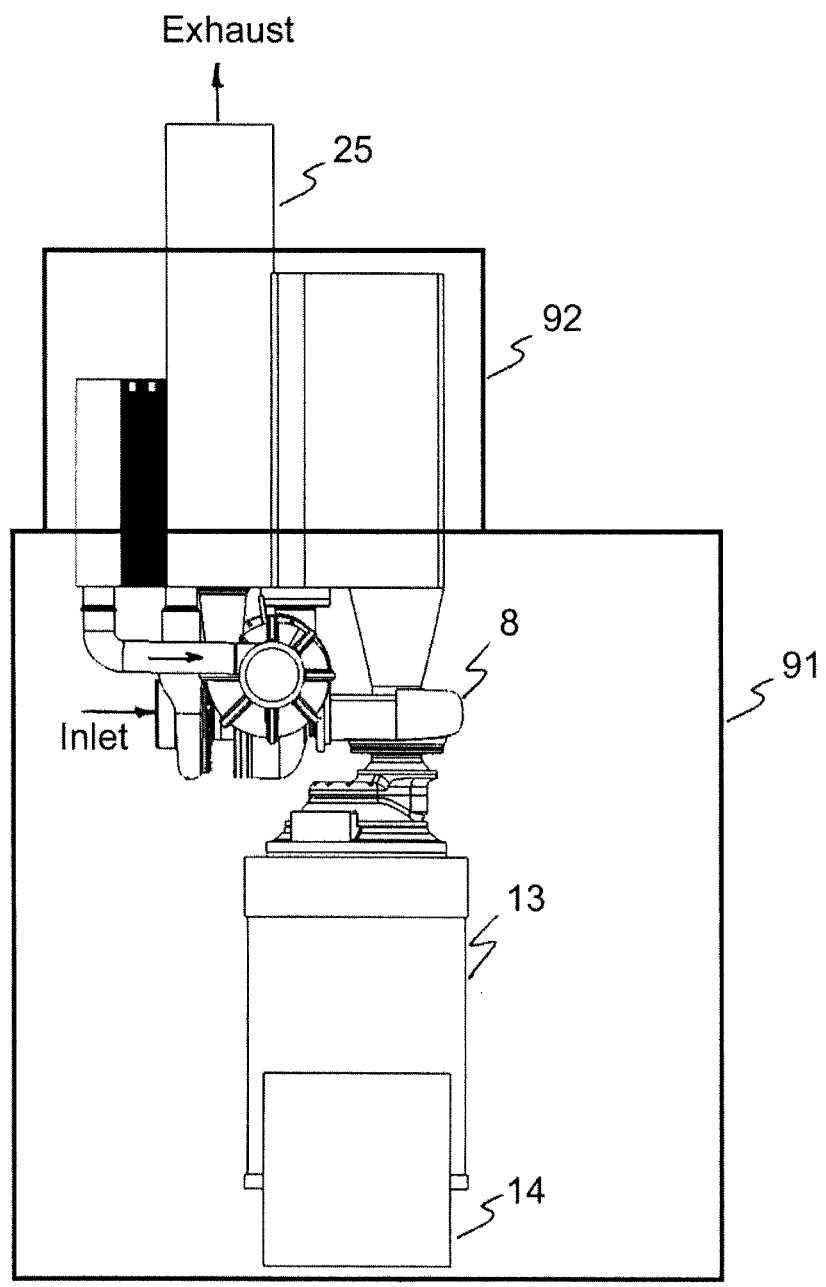
FIG. 18 is a front view of a gas turbine engine in a container.

FIG. 18 is a front view of a gas turbine engine in a container. The bottom section 91 the container houses a gas turbine engine with a generator, 13 and controls 14 mounted vertically. The top section 92 houses most of the intercooler (not shown), the recuperator and the exhaust stack 25. The top section 92 helps support the recuperator and facilitates the vertical arrangement of generator 13. The engine is supported from recuperator. Intercooler may be attached to structure of container and attached to engine by flexible bellows. The engine or its main components can be removed for maintenance or replacement through the roof of top section 92. The generator 13 may be supported from the bottom of section 91 with springs set for counterbalance when casings are at full load steady state.

Figure 19:
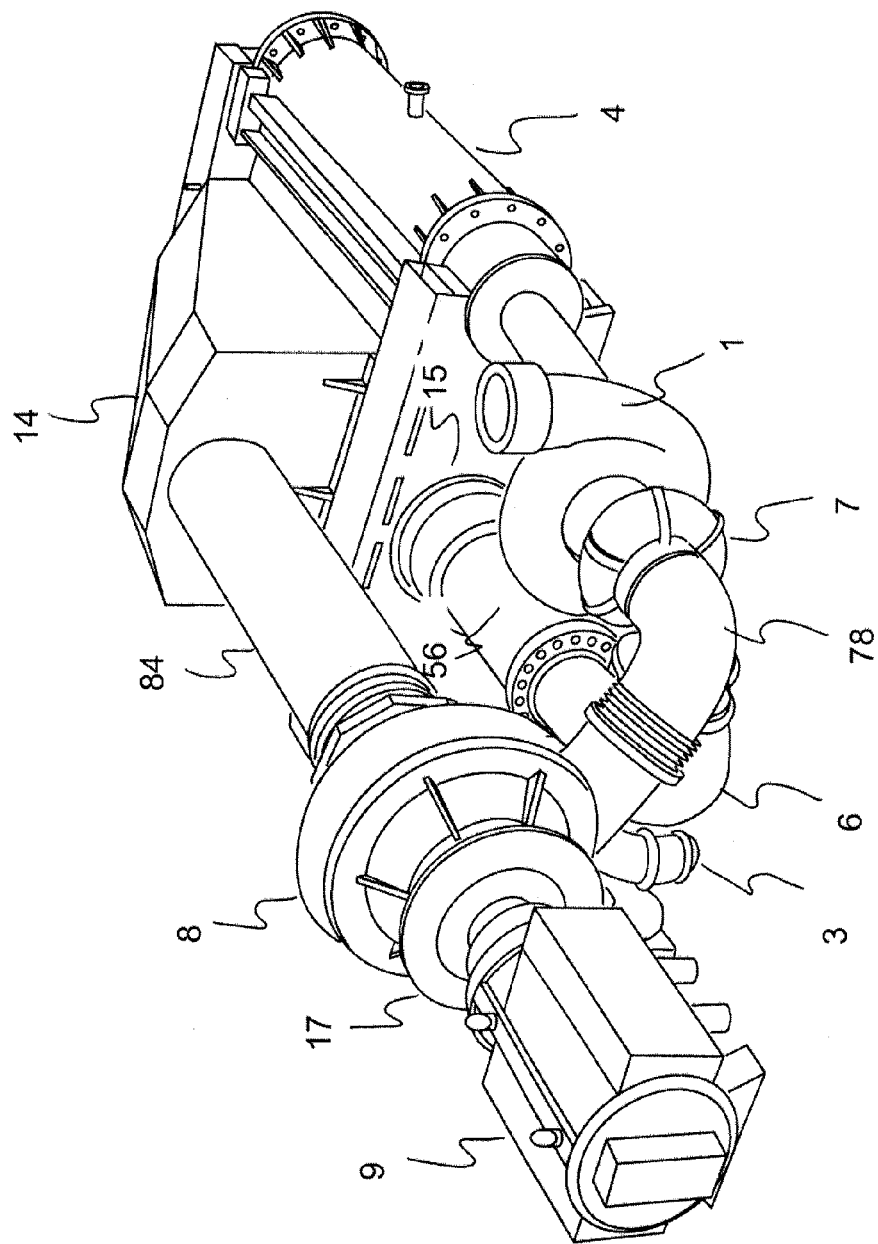
FIG. 19 is a rendering of a gas turbine engine configured for a configured for a vehicle.

FIG. 19 is a rendering of a gas turbine engine configured for a vehicle. This figure shows a load device 9, such as for example a high speed alternator, attached via a reducing gearbox 17 to the output shaft of a radial free power turbine 8. A cylindrical duct 84 delivers the exhaust from free power turbine 8 to the hot side of recuperator 4. Low pressure centrifugal compressor 1 receives its inlet air via a duct (not shown) and sends compressed inlet flow to an intercooler (also not shown) via path marked as "to IC". The flow from the intercooler is sent to high pressure centrifugal compressor 3 which is partially visible underneath radial free power turbine 8. As described previously, the compressed flow from high pressure compressor 3 is sent to the cold side of recuperator 4 and then to a combustor which is contained within a hot air pipe inside recuperator 4. The flow from combustor 5 (whose outlet end is just visible) is delivered to high pressure radial turbine 6 via cylindrical duct 56. The flow from high pressure turbine 6 is directed through low pressure radial turbine 7. The expanded flow from low pressure turbine 7 is then delivered to free power turbine 8 via a cylindrical elbow 78. Recuperator 4 is a three hole recuperator such as described in U.S. patent application Ser. No. 12/115,219 entitled "Heat Exchanger with Pressure and Thermal Strain Management".

This engine has a relatively flat efficiency curve over wide operating range. It also has a multi-fuel capability with the ability to change fuels on the fly as described in U.S. patent application Ser. No. 13/090,104 entitled "Multi-Fuel Vehicle Strategy", filed on Apr. 19, 2011 and which is incorporated herein by reference.

For example, in a large Class 8 truck application, the ability to close couple turbomachinery components can lead to the following benefits. Parts of the engine can be modular so components can be positioned throughout vehicle. The low aspect ratio and low frontal area of components such as the spools, intercooler and recuperator facilitates aerodynamic styling. The turbocharger-like components have the advantage of being familiar to mechanics who do maintenance. It can also be appreciated that the modularity of the components leads to easier maintenance by increased access and module replacement. Strategies for replacement based on simple measurements filtered by algorithms can be used to optimize maintenance strategies. These strategies could be driven by cost or efficiency. In a Class 8 truck chassis, the components can all be fitted between the main structural rails of the chassis so that the gas turbine engine occupies less space than a diesel engine of comparable power rating. This reduced size and installation flexibility facilitate retrofit and maintenance. This installation flexibility also permits the inclusion of an integrated generator/motor on either or both of the low and high pressure spools such as described in U.S. patent application Ser. No. 13/175,564, entitled "Improved Multi-Spool Intercooled Recuperated Gas Turbine". This installation flexibility also enables use of direct drive or hybrid drive transmission options.

Specific Power and Power Density

The following table illustrates the specific power and power density characteristics of the ICR350 gas turbine engine (component layout shown in FIG. 1 and physical rendering shown in FIG. 19), a modern high-performance diesel engine and a prototype gas turbine engine of comparable power output (in these examples, full power output of each engine is about 375 kW). All the engines in this table are high-thermal efficiency engines with thermal efficiencies in the range of just over 35% to about 45%. As can be appreciated, higher specific power and power densities can be achieved by eliminating components such as the intercooler and recuperator. However, this is achieved at the expense of a substantial reduction in thermal efficiency of the engine.

The table also illustrates the specific power and power density characteristics of a dual pack ICR350 engine such as shown in FIG. 8 and a four engine or quad pack ICR350 engine such as shown in FIG. 12.

| Engine | Output Power (kW) | Weight (kg) | Specific Power (kW/kg) | Volume (m$^3$) | Power Density (kW/m$^3$) |
|---|---|---|---|---|---|
| ICR350 | 375 | 545 | 0.688 | 1.577 | 241 |
| Diesel | 375 | 1,025 | 0.366 | 2.407 | 156 |
| Other ICR Gas Turbine | 338 | 1,040 | 0.325 | 2.400 | 141 |
| Dual ICR350s | 750 | 1,120 | 0.670 | 3.200 | 234 |
| Quad ICR350s | 1,500 | 2,250 | 0.667 | 6.500 | 231 |

A gas turbine engine in the output power range of about 200 kW to about 1,000 kW such as the ICR350, which is fabricated using compact centrifugal compressors and radial turbine assemblies; a high compression ratio of about 10:1 to about 20:1; an innovative compact recuperator design such as described in U.S. patent application Ser. No. 12/115,069 and U.S. patent application Ser. No. 12/115,219; nesting the combustor within the recuperator assembly; the ability to rotate the compressor and turbine independently on a turbo-compressor spool; and the ability to control spool shaft rotational direction by changing the rotors in the spools turbine and, if used, the spool's compressor, has a specific power preferably in the range of about 0.50 to about 0.75 kW/kg, more preferably in the range of about 0.55 to about 0.80 kW/kg and most preferably in the range of about 0.6 to about 0.85 kW/kg. The same gas turbine engine has a power density preferably in the range of about 175 to about 250 kW/cu m, more preferably in the range of about 175 to about 275 kW/cu m and most preferably in the range of about 200 to about 300 kW/cu m.

Similarly, a dense-packed two engine pack of the above gas turbine engine has a specific power preferably in the range of about 0.50 to about 0.75 kW/kg, more preferably in the range of about 0.55 to about 0.80 kW/kg and most preferably in the range of about 0.6 to about 0.85 kW/kg The same gas turbine dual engine pack has a power density preferably in the range of about 175 to about 250 kW/cu m, more preferably in the range of about 175 to about 275 kW/cu m and most preferably in the range of about 200 to about 300 kW/cu m.

Similarly, a dense-packed four engine pack of the above gas turbine engine has a specific power preferably in the range of about 0.50 to about 0.75 kW/kg, more preferably in the range of about 0.55 to about 0.80 kW/kg and most preferably in the range of about 0.6 to about 0.85 kW/kg. The same gas turbine four engine pack has a power density preferably in the range of about 175 to about 250 kW/cu m, more preferably in the range of about 175 to about 275 kW/cu m and most preferably in the range of about 200 to about 300 kW/cu m.

The above ranges of specific power and power density apply to gas turbine engines comprised of a gasifier section (two or more turbo-compressor spools, at least one intercooler, a recuperator and a combustor) and a free power turbine. The above ranges of specific power and power density do not include a load such as a transmission or electrical generator nor do they include emission control equipment required to meet current US emissions standards.

As used herein, specific power as used herein is power per unit mass (watts per kilogram) and power density is power per unit volume (watts per cubic meter). Thermal efficiency as used herein is shaft output power divided by flow rate of fuel energy, wherein the fuel energy is based on the low heat value of the fuel.

Folded Back Load Configuration

In transmission applications, a single reduction gear can be used for gear ratios of 10:1 to 12:1. For higher reductions, a double gear set is typically used.

For a small free power turbine (for example at full power, about 100,000 rpms and about 380 kW output), a single gear reduction may be used to reduce the rpms of the free power turbine to the rpms required by a high speed generator in the same power range. For example, typical high speed rpms of a free power turbine for a 380 kW gas turbine engine are in the range of about 30,000 to about 120,000. Typical rpms of a high speed generator are in the range of about 3,000 to about 12,000. So a single reduction gear of about 10:1 should be adequate. If desired, a double reduction gear set may be used.

A double gear reduction may be used to reduce the rpms of the above free power turbine to the rpms required by a low-speed generator in the same power range. Typical rpms of a low-speed generator are in the range of about 500 to about 1,800. So a double reduction gear of about 70:1 should be used.

Figure 20:
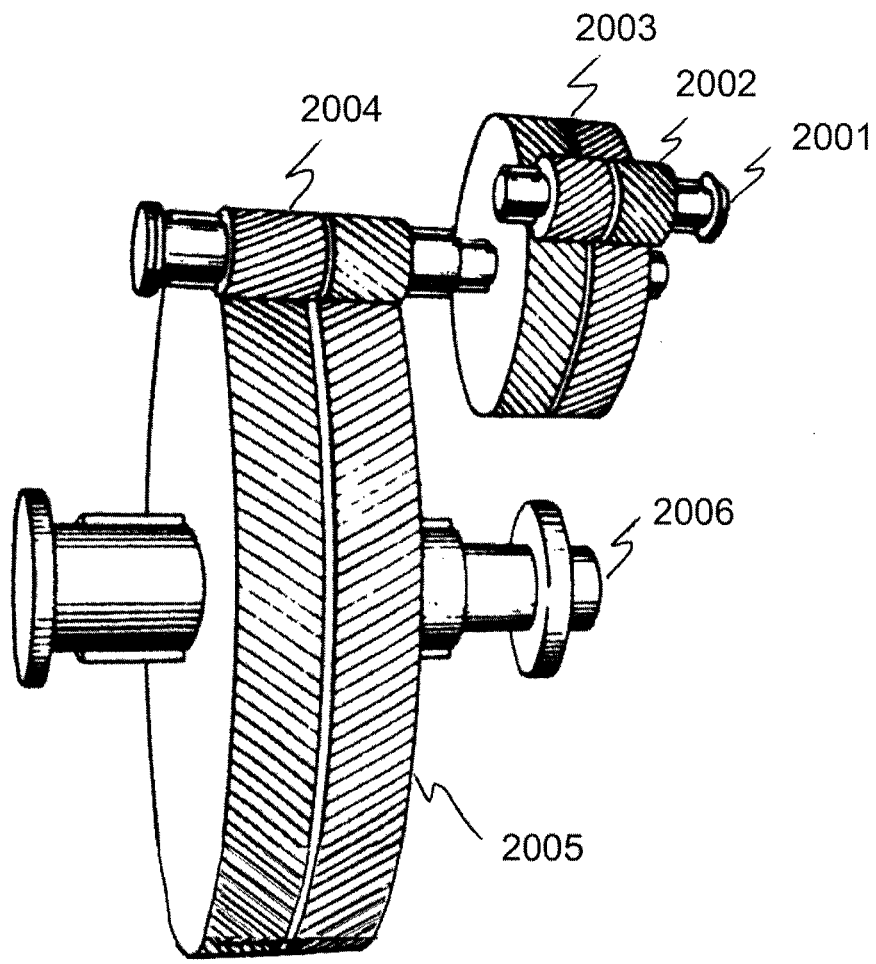
FIG. 20 is a prior art schematic of a double reduction gear set.

FIG. 20 is a prior art schematic of a double reduction gear set. This figure illustrates a double reduction gear set where the high speed input is through shaft 2001 which rotates pinion 2002. Pinion 2002 drives bull gear 2003 which is attached to and rotates pinion 2004. Pinion 2004 drives bull gear 2005 which is attached to and rotates low speed output shaft 2006. As can be seen, high speed input shaft 2001 and low speed output shaft 2006 both rotate in the same direction and allow the input device to be placed under the output device. Typical high speed input rpms of a free power turbine for a 380 kW gas turbine engine, for example, are in the range of about 30,000 to about 120,000. Typical low speed output device rpms are in the range of about 3,000 to about 12,000. The gear ratio between pinion 2002 and bull gear 2003 is preferably in the range of about 2 to about 12 and more preferably in the range of about 5 to about 10. The gear ratio between pinion 2004 and bull gear 2005 is preferably in the range of about 2 to about 12 and more preferably in the range of about 5 to about 10. The gear ratio between high speed input shaft 2001 and low speed output shaft 2006 is preferably in the range of about 4 to about 100 and more preferably in the range of about 10 to about 80.

Figure 21:
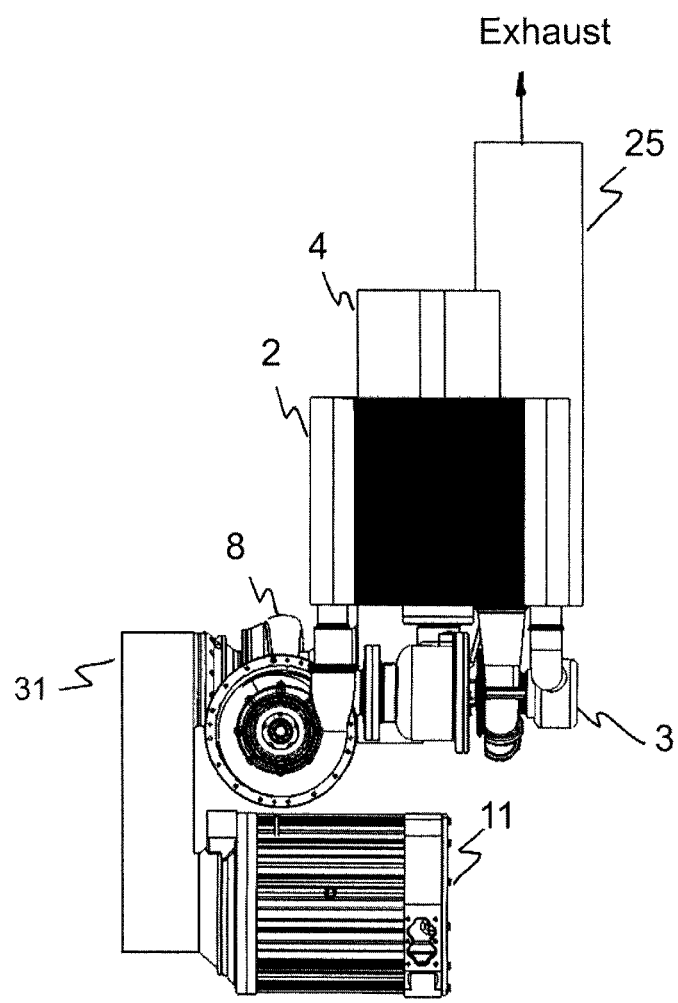
FIG. 21 is a side view of a gas turbine engine with a tucked under transmission.

FIG. 21 is a side view of a gas turbine engine with a tucked under horizontal transmission or high speed electrical generator which can be any one of a number of mechanical-to-electrical energy conversion devices defined in the Summary. This view shows intercooler 2, high pressure compressor 3, recuperator 4, recuperator exhaust stack 25 and free power turbine 8. The output shaft of free power turbine 8 is connected to a reducing gear in gearbox 31 which, in turn, is connected to transmission 11. Reducing gearbox 31 may be a single or double reducing gear set such as shown in FIG. 20 or it may be a epicyclic planetary gear set. In this configuration, the output from free power turbine 8 comes into the right side of gearbox 31 and the input to transmission 11 comes in from the left side of gearbox 31 so that transmission 11 is folded back under free power turbine 8. This configuration allows a different engine and transmission packaging arrangement than, for example, the arrangements shown in FIGS. 2 and 4.

Figure 22:
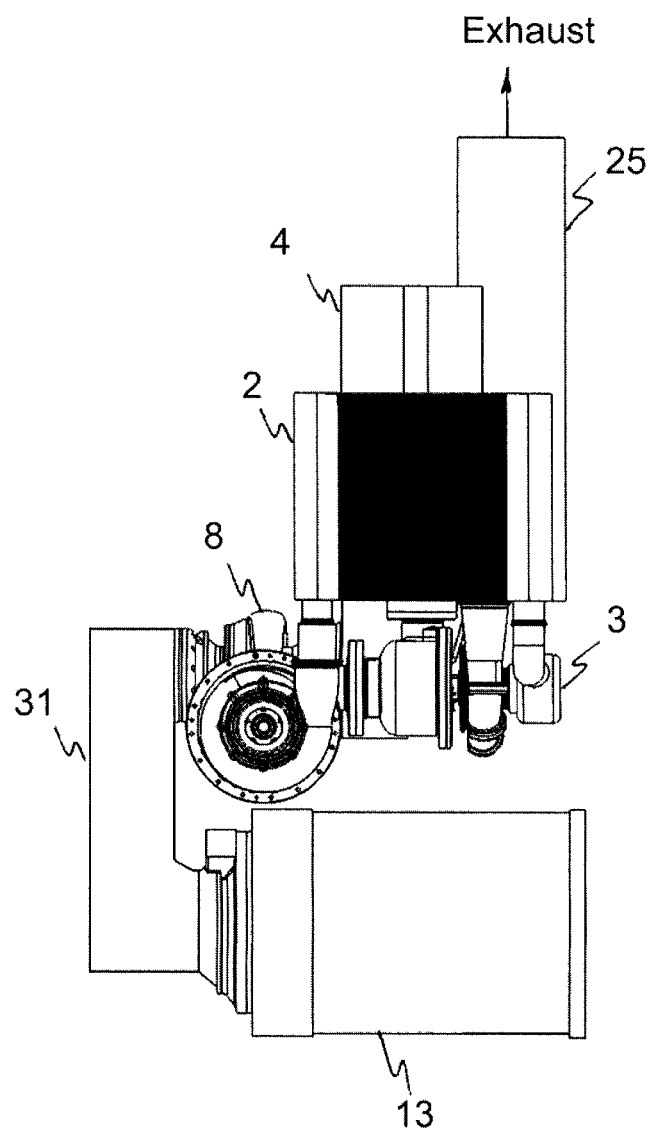
FIG. 22 is a side view of a gas turbine engine with a tucked under alternator.

FIG. 22 is a side view of a gas turbine engine with a tucked under alternator. This view shows low pressure compressor 1, intercooler 2, high pressure compressor 3, recuperator 4, recuperator exhaust stack 25, high pressure turbine 6 and free power turbine 8. The output shaft of free power turbine 8 is connected to a reducing gear in gearbox 12 which, in turn, is connected to alternator 13. Reducing gearbox 31 may be a single or a double reducing gear set such as shown in FIG. 20 or it may be a epicyclic planetary gear set. In this configuration, the output from free power turbine 8 comes into the right side of gearbox 31 and the input to alternator 13 comes in from the left side of gearbox 31 so that alternator 13 is folded back under free power turbine 8. This configuration allows a different engine and alternator packaging arrangement than, for example, the arrangements shown in FIGS. 10 and 11.

Compact Generator Configuration

In power generation where a gas turbine engine is used, a high speed generator is typically driven by the shaft of a power turbine via a reducing gear set. For the example of a gas turbine system with an output power in the range of about 300 to about 500 kW, the power turbine may spin at a rotational speed in the range of about 70,000 rpm to about 120,000 rpm. A reducing gear set is typically in the range of about 5 to about 12. Thus a high speed generator operates in the range of about 6,000 to about 15,000 rpm. A single high speed generator in the power range of about 300 to about 500 kW can be long and therefore can require a sizeable container. Typical power generating configurations are shown in FIGS. 2 to 12. A single high speed generator in the power range of about 300 to about 500 kW can be as long as 3 meters for a system in this range of power generation.

Generator speed is a function of technology. High-speed generators typically have a surface speed of less than about 300 meters per second and typically about 200 to 250 meters per second. Switched reluctance devices have the capability to go higher. As the surface speed increases so does the power density. Because of shaft dynamics, the size of machine is typically confined to a L/D ratio of less than about 3:1. Thus, as power increases so does diameter and length.

It is preferable to use a number of smaller high-speed generators, typically in the power range of about 100 kW in order to reduce the length of the high-speed generator package and reduce the gear ratio to match the generators to the power turbine.

Figure 23:
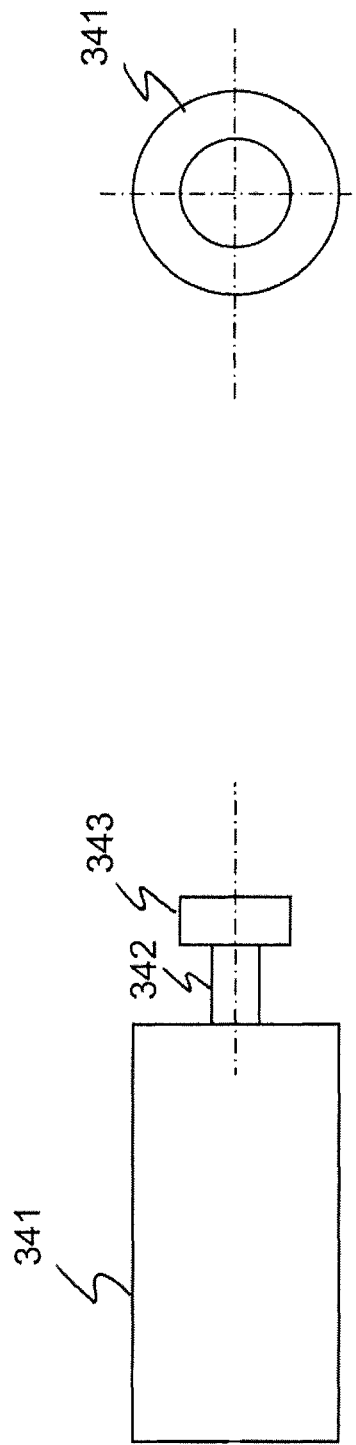
FIG. 23 is a schematic of a high speed generator.

FIG. 23 is a schematic of a high-speed generator showing the generator body 341, its mechanical input shaft 342 and its bull gear 343. FIG. 23a is a side view and FIG. 23b is an end view.

Figure 24:
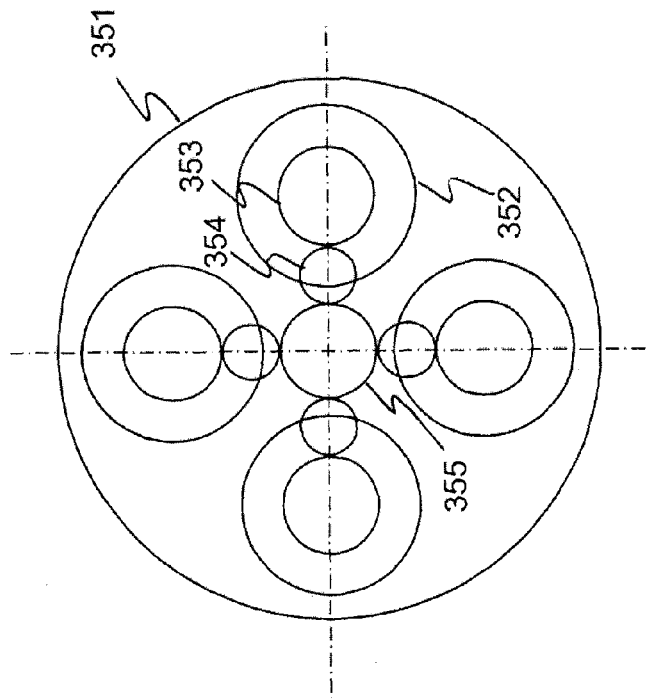
FIG. 24 is a schematic of multiple high speed generators driven by a free power turbine.
Figure 24:
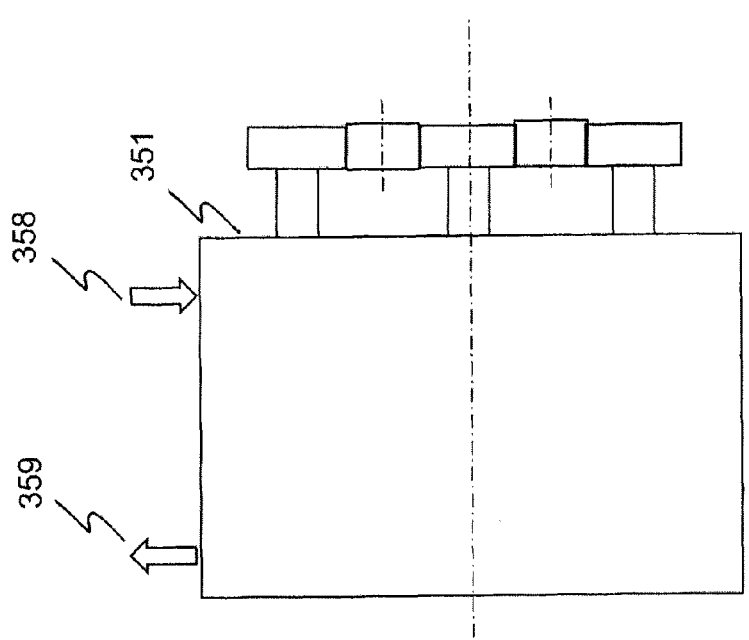

FIG. 24 is an integrated generator package schematic containing multiple high-speed generators driven by a power turbine such as a free power turbine. FIG. 24a shows a side view of a housing 351 which contains 2 or more, but preferably 4, small high-speed generators and the gear sets necessary to operate the generators from a single power shaft of a power turbine. Four high-speed generators is optimal since the power output from a power turbine, such as described in the earlier figures, is typically 4 times the power output of the size of generator that best fits the packaging envelope which provides the best combination of diameter, length and high power density. Cooling channels port the coolant to each of the 4 generators. Cooling air may be ducted in via path 358 and the heated air ducted out via path 359. FIG. 24b shows an end view illustrating a typical gearing configuration for 4 small high-speed generators driven by a single power turbine. The power turbine output shaft and its bull gear 355 are engaged with 4 pinions 354 which in turn engage 4 bull gears 353 which drive the 4 high-speed generators 352 contained inside housing 351. For example, the small high-speed generators 352 may be in the power range of about a 80 kW to about 2500 kW and the power turbine may be in the range of about 300 kW to about 1,000 kW. The advantage of this configuration is that the overall length of the power generating system may be reduced from about 3 meters to about 2 meters while delivering about the same power output. Using the smaller generators provides an additional advantage as it permits higher speed operation suitable for a high rpm power turbine and therefore requires a smaller gear ratio in the gear sets.

In summary, the multi-packed generator permits the use of proven product and maintains a higher speed and smaller length for an equivalent power output.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

A number of variations and modifications of the inventions can be used. As will be appreciated, it would be possible to provide for some features of the inventions without providing others.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter

What is claimed is:
1. A gas turbine engine, comprising:
   at least first and second turbo-compressor spools, each of the at least first and second turbo-compressor spools comprising a centrifugal compressor in mechanical communication with a radial turbine;
   at least one intercooler positioned in a fluid path between the at least first and second turbo-compressor spools;

a recuperator operable to transfer thermal energy from an output gas of a power turbine to a compressed gas produced by the at least first and second turbo-compressor spools and thereby form a further heated gas; and a combustor operable to combust a fuel in the presence of the further heated gas; wherein:

a first inlet gas to a first compressor in the first turbo-compressor spool enters the first compressor along a first axis;

a first compressed gas from the first compressor exits the first compressor along a second axis;

the first compressed gas to a second compressor in the second turbo-compressor spool enters the second compressor along a third axis;

a second compressed gas from the second compressor exits the second compressor along a fourth axis; and wherein the second axis is rotatable about the first axis and fourth axis is rotatable about the third axis.

2. The engine of claim 1, wherein the at least first and second turbo-compressor spools are comprised of a connecting shaft and the rotational direction of the connecting shaft about the first and third axes can be independently reversed.

3. The engine of claim 1 further comprising:

a free power spool associated with the radial turbine of one of the first and second turbo-compressor spools comprising a radial turbine, a variable area nozzle and a mechanical power output shaft;

an inlet gas to the free power turbine enters the free power turbine along a ninth axis;

an expanded gas from the free power turbine exits the free power turbine along a tenth axis; and wherein the ninth axis is rotatable about the tenth axis and the rotational direction of the mechanical power output shaft about the tenth axis can be reversed.

4. The engine of claim 3, wherein at least one of the following is true:

(a) at least one of the radial turbines comprises a ceramic component;

(b) a thermal energy efficiency of the engine is at least about 38%;

(c) the combustor is substantially contained within a volume occupied by the recuperator;

(d) a ratio of a gas pressure in the combustor to a gas turbine engine inlet air pressure ranges from about 10:1 to about 20:1;

(e) a power-per-unit volume for a spatial volume occupied by the gas turbine engine is at least about 175 kW/m3; and (f) a power-per-unit weight for the gas turbine engine is at least about 0.5 kW/kg.

5. A gas turbine engine, comprising:

at least first and second turbo-compressor spools, each of the at least first and second turbo-compressor spools comprising a centrifugal compressor in mechanical communication with a radial turbine;

at least one intercooler positioned in a fluid path between the at least first and second turbo-compressor spools;

a recuperator operable to transfer thermal energy from an output gas of a power turbine to a compressed gas produced by the at least first and second turbo-compressor spools and thereby form a further heated gas; and a combustor operable to combust a fuel in the presence of the further heated gas; wherein:

a first inlet gas to a first turbine in the first turbo-compressor spool enters the first turbine along a fifth axis;

a first expanded gas from the first turbine exits the first turbine along a sixth axis;

the first expanded gas to a second turbine in the second turbo-compressor spool enters the second turbine along a seventh axis;

a second expanded gas from the second turbine exits the second turbine along an eighth axis; and wherein the fifth axis is rotatable about the sixth axis and seventh axis is rotatable about the eighth axis.

6. The engine of claim 5, wherein the at least first and second turbo-compressor spools are comprised of a connecting shaft and the rotational direction of the connecting shaft about the sixth and eighth axes can be independently reversed.

7. The engine of claim 5 further comprising:

a free power spool associated with the radial turbine of one of the first and second turbo-compressor spools comprising a radial turbine, a variable area nozzle and a mechanical power output shaft;

an inlet gas to the radial turbine enters the radial turbine along a ninth axis;

an expanded gas exits the radial turbine along a tenth axis; and wherein the ninth axis is rotatable about the tenth axis and the rotational direction of the mechanical power output shaft about the tenth axis can be reversed.

8. The engine of claim 7, wherein at least one of the following is true:

(a) at least one of the blades of the radial turbine comprise a ceramic component;

(b) a thermal energy efficiency of the engine is at least about 38%;

(c) the combustor is substantially contained within a volume occupied by the recuperator;

(d) a ratio of a gas pressure in the combustor to a gas turbine engine inlet air pressure ranges from about 10:1 to about 20:1;

(e) a power-per-unit volume for a spatial volume occupied by the gas turbine engine is at least about 175 kW/m3; and (f) a power-per-unit weight for the gas turbine engine is at least about 0.5 kW/kg.

9. A power unit comprising:

(a) a first gas turbine engine comprising:

(i) at least first and second turbo-compressor spools, each of the at least first and second turbo-compressor spools comprising a centrifugal compressor in mechanical communication with a radial turbine;

(ii) at least one intercooler positioned in a fluid path between the at least first and second turbo-compressor spools;

(iii) a recuperator operable to transfer thermal energy from an output gas of a power turbine to a compressed gas produced by the at least first and second turbo-compressor spools and thereby form a further heated gas; and (iv) a combustor operable to combust a fuel in the presence of the further heated gas; wherein:

(v) a first inlet gas to a first turbine in the first turbo-compressor spool enters the first turbine along a fifth axis;

(vi) a first expanded gas from the first turbine exits the first turbine along a sixth axis;

(vii) the first expanded gas to a second turbine in the second turbo-compressor spool enters the second turbine along a seventh axis; and (viii) a second expanded gas from the second turbine exits the second turbine along an eighth axis; and ix wherein the fifth axis is rotatable about the sixth axis and seventh axis is rotatable about the eighth axis;
(b) a second gas turbine engine comprising:
(i) at least first and second turbo-compressor spools, each of the at least first and second turbo-compressor spools comprising a centrifugal compressor in mechanical communication with a radial turbine;
(ii) at least one intercooler positioned in a fluid path between the at least first and second turbo-compressor spools;
(iii) a recuperator operable to transfer thermal energy from an output gas of a power turbine to a compressed gas produced by the at least first and second turbo-compressor spools and thereby form a further heated gas; and
(iv) a combustor operable to combust a fuel in the presence of the further heated gas; wherein:
(v) a first inlet gas to a first turbine in the first turbo-compressor spool enters the first turbine along a fifth axis;
(vi) a first expanded gas from the first turbine exits the first turbine along a sixth axis;
(vii) the first expanded gas to a second turbine in the second turbo-compressor spool enters the second turbine along a seventh axis; and
(viii) a second expanded gas from the second turbine exits the second turbine along an eighth axis; and
(ix) wherein the fifth axis is rotatable about the sixth axis and seventh axis is rotatable about the eighth axis;
wherein the first gas turbine engine and the second gas turbine engine are positioned side-by-side; and
wherein the recuperator of the first gas turbine engine and the recuperator of the second gas turbine engine are positioned side-by-side with adjacent sides of the recuperator of the first gas turbine engine and the recuperator of the second gas turbine engine being substantially parallel to one another.

10. The power unit of claim 9 wherein a power-per-unit volume for a spatial volume occupied by the power unit is at least about 175 kW/m3 and a power-per-unit weight for the power unit is at least about 0.50 kW/kg.

11. The power unit of claim 9, further comprising:
(a) a third gas turbine engine comprising:
(i) at least first and second turbo-compressor spools, each of the at least first and second turbo-compressor spools comprising a centrifugal compressor in mechanical communication with a radial turbine;
(ii) at least one intercooler positioned in a fluid path between the at least first and second turbo-compressor spools;
(iii) a recuperator operable to transfer thermal energy from an output gas of a power turbine to a compressed gas produced by the at least first and second turbo-compressor spools and thereby form a further heated gas; and
a combustor operable to combust a fuel in the presence of the further heated gas; wherein:
(iv) a first inlet gas to a first turbine in the first turbo-compressor spool enters the first turbine along a fifth axis;
(v) a first expanded gas from the first turbine exits the first turbine along a sixth axis;
(vi) the first expanded gas to a second turbine in the second turbo-compressor spool enters the second turbine along a seventh axis; and
(vii) a second expanded gas from the second turbine exits the second turbine along an eighth axis; and
(viii) wherein the fifth axis is rotatable about the sixth axis and seventh axis is rotatable about the eighth axis;
(b) a fourth gas turbine engine comprising:
(i) at least first and second turbo-compressor spools, each of the at least first and second turbo-compressor spools comprising a centrifugal compressor in mechanical communication with a radial turbine;
(ii) at least one intercooler positioned in a fluid path between the at least first and second turbo-compressor spools;
(iii) a recuperator operable to transfer thermal energy from an output gas of a power turbine to a compressed gas produced by the at least first and second turbo-compressor spools and thereby form a further heated gas; and
a combustor operable to combust a fuel in the presence of the further heated gas; wherein:
(iv) a first inlet gas to a first turbine in the first turbo-compressor spool enters the first turbine along a fifth axis;
(v) a first expanded gas from the first turbine exits the first turbine along a sixth axis;
(vi) the first expanded gas to a second turbine in the second turbo-compressor spool enters the second turbine along a seventh axis; and
(vii) a second expanded gas from the second turbine exits the second turbine along an eighth axis; and
(viii) wherein the fifth axis is rotatable about the sixth axis and seventh axis is rotatable about the eighth axis;
wherein the first gas turbine engine and the second gas turbine engine are positioned side-by-side;
wherein the recuperator of first gas turbine engine and the recuperator of second gas turbine engine are positioned side-by-side with adjacent sides of the recuperator of first gas turbine engine and the recuperator of second gas turbine engine being substantially parallel to one another;
wherein the third gas turbine engine and the fourth gas turbine engine are positioned side-by-side; and
wherein the recuperator of third gas turbine engine and the recuperator of fourth gas turbine engine are positioned side-by-side with adjacent sides of the recuperator of third gas turbine engine and the recuperator of fourth gas turbine engine being substantially parallel to one another.

12. The power unit of claim 11 wherein a power-per-unit volume for a spatial volume occupied by the power unit is at least about 175 kW/m3 and a power-per-unit weight for the power unit is at least about 0.50 kW/kg.

13. A power unit comprising:
(a) a first gas turbine engine comprising:
(i) at least first and second turbo-compressor spools, each of the at least first and second turbo-compressor spools comprising a centrifugal compressor in mechanical communication with a radial turbine;
(ii) at least one intercooler positioned in a fluid path between the at least first and second turbo-compressor spools;
(iii) a recuperator operable to transfer thermal energy from an output gas of a power turbine to a compressed gas produced by the at least first and second turbo-compressor spools and thereby form a further heated gas; and
(iv) a combustor operable to combust a fuel in the presence of the further heated gas; wherein:

(v) a first inlet gas to a first turbine in the first turbo-compressor spool enters the first turbine along a fifth axis;
(vi) a first expanded gas from the first turbine exits the first turbine along a sixth axis;
(vii) the first expanded gas to a second turbine in the second turbo-compressor spool enters the second turbine along a seventh axis; and
(viii) a second expanded gas from the second turbine exits the second turbine along an eighth axis; and
(ix) wherein the fifth axis is rotatable about the sixth axis and seventh axis is rotatable about the eighth axis;
(b) a second gas turbine engine comprising:
   (i) at least first and second turbo-compressor spools, each of the at least first and second turbo-compressor spools comprising a centrifugal compressor in mechanical communication with a radial turbine;
   (ii) at least one intercooler positioned in a fluid path between the at least first and second turbo-compressor spools;
   (iii) a recuperator operable to transfer thermal energy from an output gas of a power turbine to a compressed gas produced by the at least first and second turbo-compressor spools and thereby form a further heated gas; and
   (iv) a combustor operable to combust a fuel in the presence of the further heated gas; wherein:
   (v) a first inlet gas to a first turbine in the first turbo-compressor spool enters the first turbine along a fifth axis;
   (vi) a first expanded gas from the first turbine exits the first turbine along a sixth axis;
   (vii) the first expanded gas to a second turbine in the second turbo-compressor spool enters the second turbine along a seventh axis; and
   (viii) a second expanded gas from the second turbine exits the second turbine along an eighth axis; and
   (ix) wherein the fifth axis is rotatable about the sixth axis and seventh axis is rotatable about the eighth axis;
wherein the first gas turbine engine and the second gas turbine engine are positioned side-by-side; and
wherein the intercooler of first gas turbine engine and the intercooler of second gas turbine engine are positioned side-by-side with adjacent sides of the intercooler of first gas turbine engine and the intercooler of second gas turbine engine being substantially parallel to one another.

14. The power unit of claim 13 wherein a power-per-unit volume for a spatial volume occupied by the power unit is at least about 175 kW/m3 and a power-per-unit weight for the power unit is at least about 0.50 kW/kg.

15. The power unit of claim 13, further comprising:
(a) a third gas turbine engine comprising:
   (i) at least first and second turbo-compressor spools, each of the at least first and second turbo-compressor spools comprising a centrifugal compressor in mechanical communication with a radial turbine;
   (ii) at least one intercooler positioned in a fluid path between the at least first and second turbo-compressor spools;
   (iii) a recuperator operable to transfer thermal energy from an output gas of a power turbine to a compressed gas produced by the at least first and second turbo-compressor spools and thereby form a further heated gas; and
   a combustor operable to combust a fuel in the presence of the further heated gas; wherein:
   (iv) a first inlet gas to a first turbine in the first turbo-compressor spool enters the first turbine along a fifth axis;
   (v) a first expanded gas from the first turbine exits the first turbine along a sixth axis;
   (vi) the first expanded gas to a second turbine in the second turbo-compressor spool enters the second turbine along a seventh axis; and
   (vii) a second expanded gas from the second turbine exits the second turbine along an eighth axis; and
   (viii) wherein the fifth axis is rotatable about the sixth axis and seventh axis is rotatable about the eighth axis;
(b) a fourth gas turbine engine comprising:
   (i) at least first and second turbo-compressor spools, each of the at least first and second turbo-compressor spools comprising a centrifugal compressor in mechanical communication with a radial turbine;
   (ii) at least one intercooler positioned in a fluid path between the at least first and second turbo-compressor spools;
   (iii) a recuperator operable to transfer thermal energy from an output gas of a power turbine to a compressed gas produced by the at least first and second turbo-compressor spools and thereby form a further heated gas; and
   a combustor operable to combust a fuel in the presence of the further heated gas; wherein:
   (iv) a first inlet gas to a first turbine in the first turbo-compressor spool enters the first turbine along a fifth axis;
   (v) a first expanded gas from the first turbine exits the first turbine along a sixth axis;
   (vi) the first expanded gas to a second turbine in the second turbo-compressor spool enters the second turbine along a seventh axis; and
   (vii) a second expanded gas from the second turbine exits the second turbine along an eighth axis; and
   (viii) wherein the fifth axis is rotatable about the sixth axis and seventh axis is rotatable about the eighth axis;
wherein the first gas turbine engine and the second gas turbine engine are positioned side-by-side;
wherein the intercooler of first gas turbine engine and the intercooler of second gas turbine engine are positioned side-by-side with adjacent sides of the intercooler of first gas turbine engine and the intercooler of second gas turbine engine being substantially parallel to one another;
wherein the third gas turbine engine and the fourth gas turbine engine are positioned side-by-side; and
wherein the intercooler of third gas turbine engine and the intercooler of fourth gas turbine engine are positioned side-by-side with adjacent sides of the intercooler of third gas turbine engine and the intercooler of fourth gas turbine engine being substantially parallel to one another.

16. The power unit of claim 15 wherein a power-per-unit volume for a spatial volume occupied by the power unit is at least about 175 kW/m3 and a power-per-unit weight for the power unit is at least about 0.50 kW/kg.

17. A power unit comprising:
(a) a first gas turbine engine comprising:
   (i) at least first and second turbo-compressor spools, each of the at least first and second turbo-compressor spools comprising a centrifugal compressor in mechanical communication with a radial turbine;

(ii) at least one intercooler positioned in a fluid path between the at least first and second turbo-compressor spools;
(iii) a recuperator operable to transfer thermal energy from an output gas of a power turbine to a compressed gas produced by the at least first and second turbo-compressor spools and thereby form a further heated gas; and
(iv) a combustor operable to combust a fuel in the presence of the further heated gas; wherein:
(v) a first inlet gas to a first turbine in the first turbo-compressor spool enters the first turbine along a fifth axis;
(vi) a first expanded gas from the first turbine exits the first turbine along a sixth axis;
(vii) the first expanded gas to a second turbine in the second turbo-compressor spool enters the second turbine along a seventh axis; and
(viii) a second expanded gas from the second turbine exits the second turbine along an eighth axis; and
(ix) wherein the fifth axis is rotatable about the sixth axis and seventh axis is rotatable about the eighth axis;
(x) a free power spool associated with the radial turbine comprising a radial turbine, a variable area nozzle and a mechanical power output shaft;
(xi) an inlet gas to the radial turbine enters the radial turbine along a ninth axis;
(xii) an expanded gas exits the radial turbine along a tenth axis; and
(xiii) wherein the ninth axis is rotatable about the tenth axis and the rotational direction of the mechanical power output shaft about the tenth axis can be reversed;
(b) a second gas turbine engine comprising:
(i) at least first and second turbo-compressor spools, each of the at least first and second turbo-compressor spools comprising a centrifugal compressor in mechanical communication with a radial turbine;
(ii) at least one intercooler positioned in a fluid path between the at least first and second turbo-compressor spools;
(iii) a recuperator operable to transfer thermal energy from an output gas of a power turbine to a compressed gas produced by the at least first and second turbo-compressor spools and thereby form a further heated gas; and
(iv) a combustor operable to combust a fuel in the presence of the further heated gas; wherein:
(v) a first inlet gas to a first turbine in the first turbo-compressor spool enters the first turbine along a fifth axis;
(vi) a first expanded gas from the first turbine exits the first turbine along a sixth axis;
(vii) the first expanded gas to a second turbine in the second turbo-compressor spool enters the second turbine along a seventh axis; and
(viii) a second expanded gas from the second turbine exits the second turbine along an eighth axis; and
(ix) wherein the fifth axis is rotatable about the sixth axis and seventh axis is rotatable about the eighth axis;
(x) a free power spool associated with the radial turbine comprising a radial turbine, a variable area nozzle and a mechanical power output shaft;
(xi) an inlet gas to the radial turbine enters the radial turbine along a ninth axis;
(xii) an expanded gas exits the radial turbine along a tenth axis; and
(xiii) wherein the ninth axis is rotatable about the tenth axis and the rotational direction of the mechanical power output shaft about the tenth axis can be reversed;
wherein the first gas turbine engine and the second gas turbine engine are positioned side-by-side; and
wherein the mechanical power output shaft of the free power spool of the first gas turbine engine and the mechanical power output shaft of the free power spool of the second gas turbine engine are substantially parallel to their respective exhaust pipes and substantially perpendicular to an inlet of at least one of the centrifugal compressors of the first gas turbine engine and the second gas turbine engine.

18. The power unit of claim 17 wherein a power-per-unit volume for a spatial volume occupied by the power unit is at least about 175 kW/m3 and a power-per-unit weight for the power unit is at least about 0.50 kW/kg.

19. The power unit of claim 17, further comprising:
(a) a third gas turbine engine comprising:
(i) at least first and second turbo-compressor spools, each of the at least first and second turbo-compressor spools comprising a centrifugal compressor in mechanical communication with a radial turbine;
(ii) at least one intercooler positioned in a fluid path between the at least first and second turbo-compressor spools;
(iii) a recuperator operable to transfer thermal energy from an output gas of a power turbine to a compressed gas produced by the at least first and second turbo-compressor spools and thereby form a further heated gas; and
a combustor operable to combust a fuel in the presence of the further heated gas; wherein:
(iv) a first inlet gas to a first turbine in the first turbo-compressor spool enters the first turbine along a fifth axis;
(v) a first expanded gas from the first turbine exits the first turbine along a sixth axis;
(vi) the first expanded gas to a second turbine in the second turbo-compressor spool enters the second turbine along a seventh axis; and
(vii) a second expanded gas from the second turbine exits the second turbine along an eighth axis; and
(viii) wherein the fifth axis is rotatable about the sixth axis and seventh axis is rotatable about the eighth axis;
(ix) a free power spool associated with the radial turbine comprising a radial turbine, a variable area nozzle and a mechanical power output shaft;
(x) an inlet gas to the radial turbine enters the radial turbine along a ninth axis;
(xi) an expanded gas exits the radial turbine along a tenth axis; and
(xii) wherein the ninth axis is rotatable about the tenth axis and the rotational direction of the mechanical power output shaft about the tenth axis can be reversed;
(b) a fourth gas turbine engine comprising:
(i) at least first and second turbo-compressor spools, each of the at least first and second turbo-compressor spools comprising a centrifugal compressor in mechanical communication with a radial turbine;
(ii) at least one intercooler positioned in a fluid path between the at least first and second turbo-compressor spools;

(iii) a recuperator operable to transfer thermal energy from an output gas of a power turbine to a compressed gas produced by the at least first and second turbo-compressor spools and thereby form a further heated gas; and
a combustor operable to combust a fuel in the presence of the further heated gas; wherein:
(iv) a first inlet gas to a first turbine in the first turbo-compressor spool enters the first turbine along a fifth axis;
(v) a first expanded gas from the first turbine exits the first turbine along a sixth axis;
(vi) the first expanded gas to a second turbine in the second turbo-compressor spool enters the second turbine along a seventh axis; and
(vii) a second expanded gas from the second turbine exits the second turbine along an eighth axis; and
(viii) wherein the fifth axis is rotatable about the sixth axis and seventh axis is rotatable about the eighth axis;
(ix) a free power spool associated with the radial turbine comprising a radial turbine, a variable area nozzle and a mechanical power output shaft;
(x) an inlet gas to the radial turbine enters the radial turbine along a ninth axis;
(xi) an expanded gas exits the radial turbine along a tenth axis; and
(xii) wherein the ninth axis is rotatable about the tenth axis and the rotational direction of the mechanical power output shaft about the tenth axis can be reversed;
wherein the third gas turbine engine and the fourth gas turbine engine are positioned side-by-side; and
wherein the mechanical power output shaft of the free power spool of the third gas turbine engine and the mechanical power output shaft of the free power spool of the fourth gas turbine engine are substantially parallel to their respective exhaust pipes and substantially perpendicular to an inlet of at least one of the centrifugal compressors of the third gas turbine engine and the fourth gas turbine engine.

20. The power unit of claim 19 wherein a power-per-unit volume for a spatial volume occupied by the power unit is at least about 175 kW/m3 and a power-per-unit weight for the power unit is at least about 0.50 kW/kg.

21. A power unit comprising:
(a) a first gas turbine engine comprising:
(i) at least first and second turbo-compressor spools, each of the at least first and second turbo-compressor spools comprising a centrifugal compressor in mechanical communication with a radial turbine;
(ii) at least one intercooler positioned in a fluid path between the at least first and second turbo-compressor spools;
(iii) a recuperator operable to transfer thermal energy from an output gas of a power turbine to a compressed gas produced by the at least first and second turbo-compressor spools and thereby form a further heated gas; and
(iv) a combustor operable to combust a fuel in the presence of the further heated gas; wherein:
(v) a first inlet gas to a first turbine in the first turbo-compressor spool enters the first turbine along a fifth axis;
(vi) a first expanded gas from the first turbine exits the first turbine along a sixth axis;
(vii) the first expanded gas to a second turbine in the second turbo-compressor spool enters the second turbine along a seventh axis; and
(viii) a second expanded gas from the second turbine exits the second turbine along an eighth axis; and
(ix) wherein the fifth axis is rotatable about the sixth axis and seventh axis is rotatable about the eighth axis;
(x) a free power spool associated with the radial turbine comprising a radial turbine, a variable area nozzle and a mechanical power output shaft;
(xi) an inlet gas to the radial turbine enters the radial turbine along a ninth axis;
(xii) an expanded gas exits the radial turbine along a tenth axis; and
(xiii) wherein the ninth axis is rotatable about the tenth axis and the rotational direction of the mechanical power output shaft about the tenth axis can be reversed;
(b) a second gas turbine engine comprising:
(i) at least first and second turbo-compressor spools, each of the at least first and second turbo-compressor spools comprising a centrifugal compressor in mechanical communication with a radial turbine;
(ii) at least one intercooler positioned in a fluid path between the at least first and second turbo-compressor spools;
(iii) a recuperator operable to transfer thermal energy from an output gas of a power turbine to a compressed gas produced by the at least first and second turbo-compressor spools and thereby form a further heated gas; and
(iv) a combustor operable to combust a fuel in the presence of the further heated gas; wherein:
(v) a first inlet gas to a first turbine in the first turbo-compressor spool enters the first turbine along a fifth axis;
(vi) a first expanded gas from the first turbine exits the first turbine along a sixth axis;
(vii) the first expanded gas to a second turbine in the second turbo-compressor spool enters the second turbine along a seventh axis; and
(viii) a second expanded gas from the second turbine exits the second turbine along an eighth axis; and
(ix) wherein the fifth axis is rotatable about the sixth axis and seventh axis is rotatable about the eighth axis;
(x) a free power spool associated with the radial turbine comprising a radial turbine, a variable area nozzle and a mechanical power output shaft;
(xi) an inlet gas to the radial turbine enters the radial turbine along a ninth axis;
(xii) an expanded gas exits the radial turbine along a tenth axis; and
(xiii) wherein the ninth axis is rotatable about the tenth axis and the rotational direction of the mechanical power output shaft about the tenth axis can be reversed;
wherein the first gas turbine engine and the second gas turbine engine are positioned side-by-side; and
wherein the mechanical power output shaft of the free power spool of the first gas turbine engine and the mechanical power output shaft of the free power spool of the second gas turbine engine are substantially perpendicular to their respective exhaust pipes and substantially perpendicular to an inlet of at least one of the centrifugal compressors of the first gas turbine engine and the second gas turbine engine.

22. The power unit of claim 21 wherein a power-per-unit volume for a spatial volume occupied by the power unit is at least about 175 kW/m3 and a power-per-unit weight for the power unit is at least about 0.50 kW/kg.

23. The power unit of claim 21, further comprising:
(a) a third gas turbine engine comprising:
  (i) at least first and second turbo-compressor spools, each of the at least first and second turbo-compressor spools comprising a centrifugal compressor in mechanical communication with a radial turbine;
  (ii) at least one intercooler positioned in a fluid path between the at least first and second turbo-compressor spools;
  (iii) a recuperator operable to transfer thermal energy from an output gas of a power turbine to a compressed gas produced by the at least first and second turbo-compressor spools and thereby form a further heated gas; and
  a combustor operable to combust a fuel in the presence of the further heated gas; wherein:
  (iv) a first inlet gas to a first turbine in the first turbo-compressor spool enters the first turbine along a fifth axis;
  (v) a first expanded gas from the first turbine exits the first turbine along a sixth axis;
  (vi) the first expanded gas to a second turbine in the second turbo-compressor spool enters the second turbine along a seventh axis; and
  (vii) a second expanded gas from the second turbine exits the second turbine along an eighth axis; and
  (viii) wherein the fifth axis is rotatable about the sixth axis and seventh axis is rotatable about the eighth axis;
  (ix) a free power spool associated with the radial turbine comprising a radial turbine, a variable area nozzle and a mechanical power output shaft;
  (x) an inlet gas to the radial turbine enters the radial turbine along a ninth axis;
  (xi) an expanded gas exits the radial turbine along a tenth axis; and
  (xii) wherein the ninth axis is rotatable about the tenth axis and the rotational direction of the mechanical power output shaft about the tenth axis can be reversed;
(b) a fourth gas turbine engine comprising:
  (i) at least first and second turbo-compressor spools, each of the at least first and second turbo-compressor spools comprising a centrifugal compressor in mechanical communication with a radial turbine;
  (ii) at least one intercooler positioned in a fluid path between the at least first and second turbo-compressor spools;
  (iii) a recuperator operable to transfer thermal energy from an output gas of a power turbine to a compressed gas produced by the at least first and second turbo-compressor spools and thereby form a further heated gas; and
  a combustor operable to combust a fuel in the presence of the further heated gas; wherein:
  (iv) a first inlet gas to a first turbine in the first turbo-compressor spool enters the first turbine along a fifth axis;
  (v) a first expanded gas from the first turbine exits the first turbine along a sixth axis;
  (vi) the first expanded gas to a second turbine in the second turbo-compressor spool enters the second turbine along a seventh axis; and
  (vii) a second expanded gas from the second turbine exits the second turbine along an eighth axis; and
  (viii) wherein the fifth axis is rotatable about the sixth axis and seventh axis is rotatable about the eighth axis;
  (ix) a free power spool associated with the radial turbine comprising a radial turbine, a variable area nozzle and a mechanical power output shaft;
  (x) an inlet gas to the radial turbine enters the radial turbine along a ninth axis;
  (xi) an expanded gas exits the radial turbine along a tenth axis; and
  (xii) wherein the ninth axis is rotatable about the tenth axis and the rotational direction of the mechanical power output shaft about the tenth axis can be reversed;
wherein the third gas turbine engine and the fourth gas turbine engine are positioned side-by-side; and
wherein the mechanical power output shaft of the free power spool of the third gas turbine engine and the mechanical power output shaft of the free power spool of the fourth gas turbine engine are substantially perpendicular to their respective exhaust pipes and substantially perpendicular to an inlet of at least one of the centrifugal compressors of the third gas turbine engine and the fourth gas turbine engine.

24. The power unit of claim 23 wherein a power-per-unit volume for a spatial volume occupied by the power unit is at least about 175 kW/m3 and a power-per-unit weight for the power unit is at least about 0.50 kW/kg.

25. A method, comprising:
providing a first gas turbine engine in a first gas turbine engine configuration, the gas turbine engine having:
  a first turbo-compressor spool with a first centrifugal compressor in mechanical communication with a first radial turbine,
  a second turbo-compressor spool with a second centrifugal compressor in mechanical communication with a second radial turbine,
  at least one intercooler positioned in a fluid path between the first and second turbo-compressor spools,
  a recuperator operable to transfer thermal energy from an output gas of a power turbine to a compressed gas produced by at least one of the first and second turbo-compressor spools and thereby form a further heated gas, and
  a combustor operable to combust a fuel in the presence of the further heated gas,
transferring a first inlet gas to the first compressor along a first axis thereof;
transferring a first compressed gas from an exit of the first compressor along a second axis thereof;
transferring the first compressed gas to the second compressor along a third axis thereof, wherein the second axis has a first orientation relative to the first axis;
transferring a second compressed gas from an exit of the second compressor along a fourth axis thereof, wherein the third axis has a first orientation relative to the fourth axis; and
rotating at least one of (a) the second axis about the first axis to provide a second gas turbine engine configuration in which the second axis has a second orientation relative to the first axis, and (b) the third axis about the fourth axis to provide a third gas turbine engine configuration in which the third axis has a second orientation relative to the fourth axis.

26. The method of claim 25 further providing a gas turbine engine having a free power spool, which is associated with the first radial turbine or the second radial turbine, comprising a third radial turbine, a variable area nozzle, and a mechanical power output shaft wherein an inlet gas to the free power turbine enters along a ninth axis thereof and an expanded gas exits along a tenth axis thereof; and rotating the ninth axis about the tenth axis to provide a fourth gas turbine engine configuration in which the ninth axis has a second orientation relative to the tenth axis.

27. The method of claim 26 wherein, in the first gas turbine engine configuration, the second axis has a first orientation relative to the first axis, wherein, in a second gas turbine engine configuration, the second axis has a second orientation relative to the first axis, wherein in a third gas turbine engine configuration, the fourth axis has a third orientation relative to the third axis and in a fourth gas turbine engine configuration the fourth axis has a fourth orientation relative to the third axis, wherein in any of the first, second, third, and fourth engine configurations the ninth axis has a variable orientation relative to the first and third axes and wherein the gas turbine engine is operable in any of the first, second, third, and fourth gas turbine engine configurations.

28. The method of claim 25 wherein, in the first gas turbine engine configuration, the second axis has a first orientation relative to the first axis, wherein (a) is true, wherein the first and second orientations are different, and wherein the first compressed gas is deliverable to the second compressor in both the first and second gas turbine engine configurations.

29. The method of claim 25, wherein, in a fourth gas turbine engine configuration, the fourth axis has a fourth orientation relative to the third axis, wherein (b) is true, wherein the third and fourth orientations are different, and wherein the second compressed gas is deliverable to the recuperator in both the third and fourth gas turbine engine configurations.

30. A method, comprising:
providing a first gas turbine engine in a first gas turbine engine configuration, the gas turbine engine having:
a first turbo-compressor spool with a first centrifugal compressor in mechanical communication with a first radial turbine,
a second turbo-compressor spool with a second centrifugal compressor in mechanical communication with a second radial turbine,
at least one intercooler positioned in a fluid path between the first and second turbo-compressor spools,
a recuperator operable to transfer thermal energy from an output gas of a power turbine to a compressed gas produced by at least one of the first and second turbo-compressor spools and thereby form a further heated gas, and
a combustor operable to combust a fuel in the presence of the further heated gas,
transferring a first inlet gas to the first radial turbine along a fifth axis thereof;
transferring a first compressed gas from an exit of the first radial turbine along a sixth axis thereof, wherein the fifth axis has a first orientation relative to the sixth axis;
transferring the first compressed gas to the second radial turbine along a seventh axis thereof;
transferring a second compressed gas from an exit of the second radial turbine along an eighth axis thereof, wherein the seventh axis has a first orientation relative to the eighth axis; and
rotating at least one of (a) the fifth axis about the sixth axis to provide a second gas turbine engine configuration in which the fifth axis has a second orientation relative to the sixth axis, and (b) the seventh axis about the eighth axis to provide a third gas turbine engine configuration in which the seventh axis has a second orientation relative to the eighth axis.

31. The method of claim 30 further providing a gas turbine engine having a free power spool, which is associated with the first radial turbine or the second radial turbine, comprising a third radial turbine, a variable area nozzle and a mechanical power output shaft wherein an inlet gas to the free power turbine enters the free power turbine along a ninth axis and an expanded gas from the free power turbine exits the free power turbine along a tenth axis; and rotating the ninth axis about the tenth axis to provide a fourth gas turbine engine configuration in which the ninth axis has a second orientation relative to the tenth axis.

32. The method of claim 31 wherein, in the first gas turbine engine configuration, the fifth axis has a first orientation relative to the sixth axis, wherein, in a second gas turbine engine configuration, the fifth axis has a second orientation relative to the sixth axis, wherein in a third gas turbine engine configuration, the seventh axis has a third orientation relative to the eighth axis and in a fourth gas turbine engine configuration the seventh axis has a fourth orientation relative to the eighth axis, wherein in any of the first, second, third, and fourth engines configurations the ninth axis has a variable orientation relative to the sixth and eighth axes and wherein the gas turbine engine is operable in any of the first, second, third, and fourth gas turbine engine configurations.

33. The method of claim 30 wherein, in the first gas turbine engine configuration, the fifth axis has a first orientation relative to the sixth axis, wherein (a) is true, wherein the first and second orientations are different, and wherein the first expanded gas is deliverable to the second turbine in both the first and second gas turbine engine configurations.

34. The method of claim 33, wherein, in a fourth gas turbine engine configuration, the eighth axis has a fourth orientation relative to the seventh axis, wherein (b) is true, wherein the third and fourth orientations are different, and wherein the second expanded gas is deliverable to a free power turbine in both the third and fourth gas turbine engine configurations.

* * * * *